United States Patent
Robson et al.

(10) Patent No.: US 10,627,375 B2
(45) Date of Patent: Apr. 21, 2020

(54) REPLACEABLE EMITTER ASSEMBLY FOR INTERFACING A SEPARATION COLUMN TO A MASS SPECTROMETER

(71) Applicants: THERMO HYPERSIL-KEYSTONE LLC, Bellefonte, PA (US); DIONEX CORPORATION, Sunnyvale, CA (US)

(72) Inventors: Brandon Howard Robson, Bellefonte, PA (US); Xuefei Sun, San Jose, CA (US); Xiaodong Liu, Cupertino, CA (US)

(73) Assignees: Thermo Hypersil-Keystone LLC, Bellefonte, PA (US); Dionex Corporation, Sunnyvale, CA (US)

( * ) Notice: Subject to any disclaimer, the term of this patent is extended or adjusted under 35 U.S.C. 154(b) by 0 days.

(21) Appl. No.: 15/649,220

(22) Filed: Jul. 13, 2017

(65) Prior Publication Data
US 2018/0017534 A1    Jan. 18, 2018

Related U.S. Application Data

(60) Provisional application No. 62/361,692, filed on Jul. 13, 2016.

(51) Int. Cl.
*G01N 30/72*    (2006.01)
*H01J 49/04*    (2006.01)
*H01J 49/16*    (2006.01)

(52) U.S. Cl.
CPC ...... *G01N 30/7266* (2013.01); *H01J 49/0431* (2013.01); *H01J 49/167* (2013.01)

(58) Field of Classification Search
CPC .............. G01N 30/724; G01N 30/7266; H01J 49/0431; H01J 49/0445; H01J 49/045; H01J 49/165; H01J 49/167
See application file for complete search history.

(56) References Cited

U.S. PATENT DOCUMENTS 5,597,467 A * 1/1997 Zhu .................. G01N 27/44717
                                            204/452
5,965,883 A * 10/1999 Lee ........................ H01J 49/167
                                            250/288

(Continued)

FOREIGN PATENT DOCUMENTS

WO    WO2013167131 A1    11/2013

OTHER PUBLICATIONS

Fortier et al., "Integrated Microfluidic Device for Mass Spectrometry-Based Proteomics and Its Application to Biomarker Discovery Programs," Anal. Chem., 77, 1631-1640, 2005.

(Continued)

*Primary Examiner* — David E Smith
(74) *Attorney, Agent, or Firm* — David A. Schell; A. J. Gokcek

(57) ABSTRACT

An electrospray emitter assembly for interfacing a separation column to a mass spectrometer is disclosed. An emitter capillary includes an inlet end and an outlet end. A fitting is coupled to the inlet end of the emitter, configured to be removably connected to the separation column. A stop with a defined through hole is integrated proximate the inlet end of the emitter to produce a path for liquid to flow from the separation column to the emitter via the through hole where a voltage is applied to the liquid entering the emitter.

22 Claims, 23 Drawing Sheets

(56) References Cited

U.S. PATENT DOCUMENTS

| | | | | |
|---|---|---|---|---|
| 6,127,680 A | * | 10/2000 | Andrien, Jr. | H01J 49/167 250/281 |
| 2005/0023455 A1 | * | 2/2005 | Bailey | H01J 49/165 250/288 |
| 2005/0092917 A1 | * | 5/2005 | Hirabayashi | G01N 30/7266 250/288 |
| 2009/0250608 A1 | * | 10/2009 | Mordehai | H01J 49/167 250/288 |
| 2014/0158599 A1 | * | 6/2014 | Michienzi | G01N 30/603 210/198.2 |
| 2014/0305801 A1 | * | 10/2014 | Peterson | H01J 49/022 204/604 |
| 2015/0198571 A1 | * | 7/2015 | Vorm | H01J 49/165 73/61.55 |

OTHER PUBLICATIONS

Smith et al., "Ultrasensitive and Quantitative Analyses from Combined Separations—Mass Spectrometry for the Characterization of Proteomes," Acc. Chem. Res., 37, 269-278, 2004.

\* cited by examiner

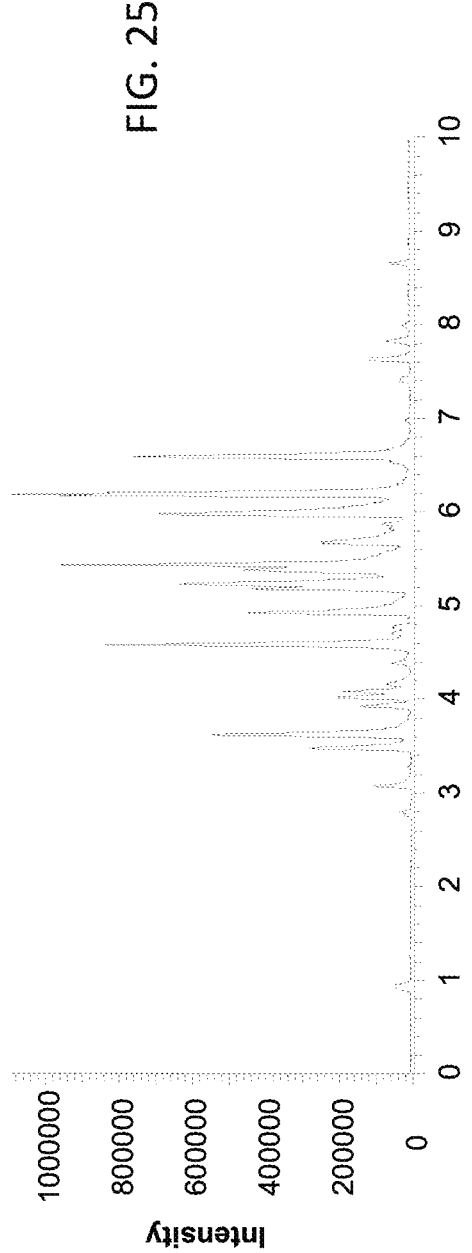
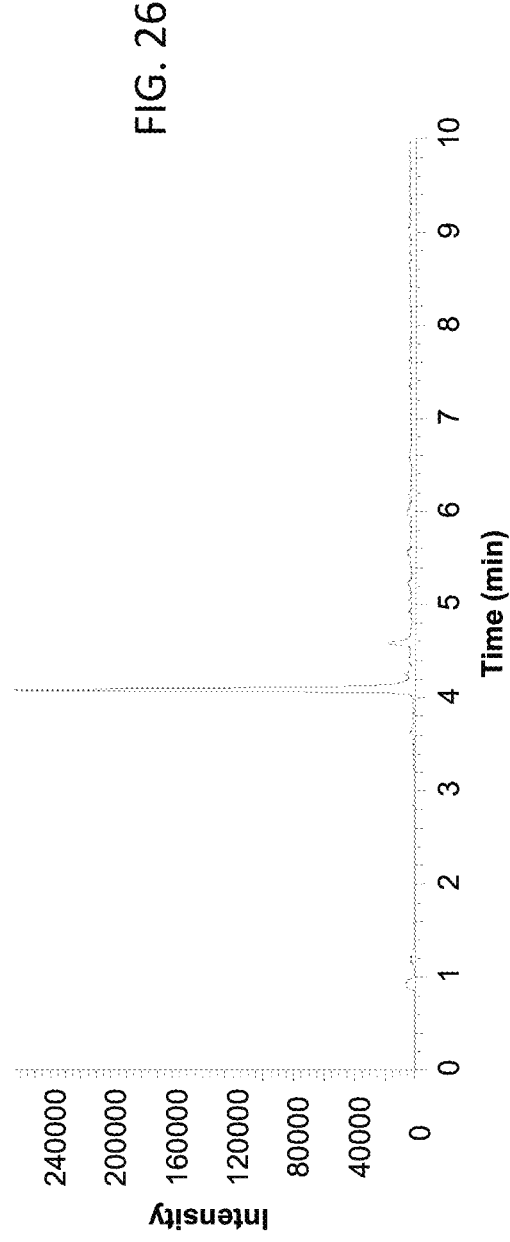

REPLACEABLE EMITTER ASSEMBLY FOR INTERFACING A SEPARATION COLUMN TO A MASS SPECTROMETER

CROSS-REFERENCE TO RELATED APPLICATIONS

This application claims the benefit of U.S. Provisional Application No. 62/361,692, filed Jul. 13, 2016, the entire contents of which are incorporated herein.

FIELD OF THE INVENTION

This invention relates to electrospray emitter capillaries. More specifically, this invention relates to a low dead volume replaceable emitter assembly for interfacing a separation column to a mass spectrometer.

BACKGROUND OF THE INVENTION

Mass spectrometry (MS) has become an essential analytical tool due to its high sensitivity and ability to detect and identify a large number of analytes while also providing structural information of various molecules, which is very useful especially for biological sample analysis. Liquid chromatography (LC) is the advanced separation technique to resolve different species dissolved in the liquid phase, principally based on the difference of molecular properties.

LC-MS, a combination of powerful separation and identification techniques, is currently widely used in a broad range of fields, including pharma, biopharma, clinical, environmental, food safety, forensic, omics (proteomics, metabolomics, genomics, glycomics, and so on), academic research, regulatory agents, etc. As the front end tool, LC separates the components present in the sample and/or reduces the sample complexity before entering into MS for detection.

Electrospray ionization (ESI) is a technique to produce gas phase ions from liquid solution while applying a high voltage to create aerosol. ESI is commonly used as the interface to couple liquid phase separation methods (LC and CE) with MS. The ESI emitter, typically a needle or capillary made from fused silica, metal, or glass, connects with the LC column outlet and is located in the front of MS. As a soft ion source, ESI can create multiply charged molecule ions from LC elution, which provide the molecular weight information of the analytes of interest and are prone to conduct tandem MS (e.g., $MS^2$) to explore their structure information.

ESI interfaces play an important role on LC-MS sensitivity. It is well known that ion loss during electrospray is one of the major causes affecting MS detection sensitivity. ESI efficiency or ionization efficiency increases with the decrease of the liquid flow rate and can approach 100% at low nL/min flow rates [Smith, R. D.; Shen, Y.; Tang, K. Acc. Chem. Res. 2004, 37, 269-278]. Very often, limited sample amounts, sample complexity, and the quest for highest possible MS sensitivity require the use of small inner diameter columns from 1.0-mm down to 20 µm, with corresponding operating flow rates from 100 µL/min to less than 20 nL/min. With a decrease in column inner diameter, the operating flow rate also decreases, which is more suitable for high sensitive MS detection.

An ESI interface also affects the LC separation performance because it introduces the post-separation extra-column dwell volume (dead volume) due to required connections, which will broaden the peaks and, therefore, decrease the resolution, signal intensity, and also impact MS detection (e.g. data-dependent $MS^2$). Minimizing such extra column dwell volume is essential to achieve desired LC separation and MS results. Although small transfer lines are used to connect the column and emitter when using traditional ESI source, the presence of too many connections and transfer lines still affects the quality of data. This impact becomes more significant for low flow columns, particularly nano columns.

Typically the nano spray emitter is directly attached to the nano column outlet using a union to minimize the extra-column dwell volume (no extra transfer line and few connections). Currently, most end-users assemble the nano spray emitter with the nano LC column by themselves using the sleeves and fittings. However, this approach is prone to improper connections resulting in leaks, column/emitter breaks, or undesired dead-volumes, and consequently poor chromatographic separation and detection sensitivity. Also it may be difficult to achieve results with good reproducibility due to large variation of the emitter dimension and connections. The plug unit and connection system disclosed in US 2015/9091693 (e.g. nanoViper™ fitting, Thermo Fisher Scientific, Waltham, Mass., USA) has a virtually zero dead volume for connecting capillary tubes. It is convenient to achieve reliable connections, especially for ultra-high pressure liquid chromatography.

Besides selecting the correct LC column for desired separations, e.g. a nano LC column, minimizing, even eliminating, user intervention with the analytical techniques is also demanded to ensure reproducible results. A microchip based LC-ESI device integrates a trapping column, a separation column, and an electrospray emitter within a single structure [Fortier, M. H.; Bonneil, E.; Goodley, P.; Thibault, P. Anal. Chem. 2005, 77, 1631-1640]. While this integrated system has less dead volume, the chromatographic performance is currently not able to compete with that of conventional non-chip based systems due to the technology limitations and low column pressure rating.

The EASY-Spray™ column (Thermo Fisher Scientific, Waltham, Mass., USA) is an integrated system mainly containing a separation column and heating unit embedded in a plastic material, and an electrospray emitter which is connected with the separation column and protected by a retractable sleeve. [WO 2013/167131]. Because the connection of the column and emitter is embedded in the plastic material, the emitter is not able to be replaced when it fails, for example, due to clogging. In this case, the entire system is unusable even though the separation column is still functional.

To overcome the above challenges, it is desired to develop a stand-alone emitter assembly that provides a low dead-volume connection between the separation column and the mass spectrometer (or ion source of the mass spectrometer), is compatible with a broad range of flow rates, including nano LC-MS applications, and is easily replaced.

SUMMARY

Embodiments of the present invention disclose an electrospray emitter assembly for interfacing a separation column to a mass spectrometer. In one embodiment of the present invention, the emitter assembly comprises an emitter capillary having an inlet end and an outlet end. A fitting is coupled to the inlet end of the emitter, and the emitter is configured to be removably connected to the separation column via the fitting. A stop with a defined through hole is integrated proximate the inlet end of the emitter to produce a path for liquid to flow from the separation column to the emitter via the through hole. A voltage is applied across the stop with the through hole to the liquid entering the emitter.

The fitting may be a female threaded end fitting configured for engagement with a plug type capillary fitting of the separation column.

The emitter may comprise, but is not limited to, a fused silica capillary, a metal capillary, a ceramic capillary, or a glass capillary.

In some embodiments, the separation column is removably connected via a transfer line or capillary with the emitter capillary through the fitting. The separation column may be a liquid chromatography (LC) column.

In some embodiments, the integrated stop has a thickness of up to 1.0 mm. In some other embodiments, the integrated stop has a thickness of between 100 μm to 300 μm.

In some embodiments, the through hole in the stop has a diameter of between 3 μm and 100 μm.

The emitter assembly may include a retractable protective sleeve for covering and supporting the emitter. In some embodiments, the retractable protective sleeve is slidably mounted around the emitter and moveable to an extended position where the tip of the emitter is covered by the protective sleeve. A resilient member, such as a spring, is provided to bias the protective sleeve towards the extended position covering the tip of the emitter. The retractable protective sleeve is also moveable to a retracted position such that the tip is uncovered.

The emitter assembly may further include an electrically conductive outer sheath, such that the protective sleeve is enclosed and moveable within the outer sheath.

In another embodiment of the present invention, an electrospray emitter for interfacing a separation column to a mass spectrometer is disclosed. The emitter assembly includes an emitter capillary having an inlet end and an outlet end. A plug type end fitting is coupled to the inlet end of the emitter, and the emitter is configured to be removably connected to the separation column via the plug type end fitting. In some embodiments, the plug type end fitting is a male threaded end fitting.

BRIEF DESCRIPTION OF THE DRAWINGS

FIG. 25 shows a base peak chromatogram of the BSA tryptic digest analyzed using a 500 μm inner diameter column coupled with the male type emitter assembly described in Example 4.

FIG. 26 shows the extracted ion chromatogram of ion with m/z 722.

DETAILED DESCRIPTION OF EMBODIMENTS

Figure 1:
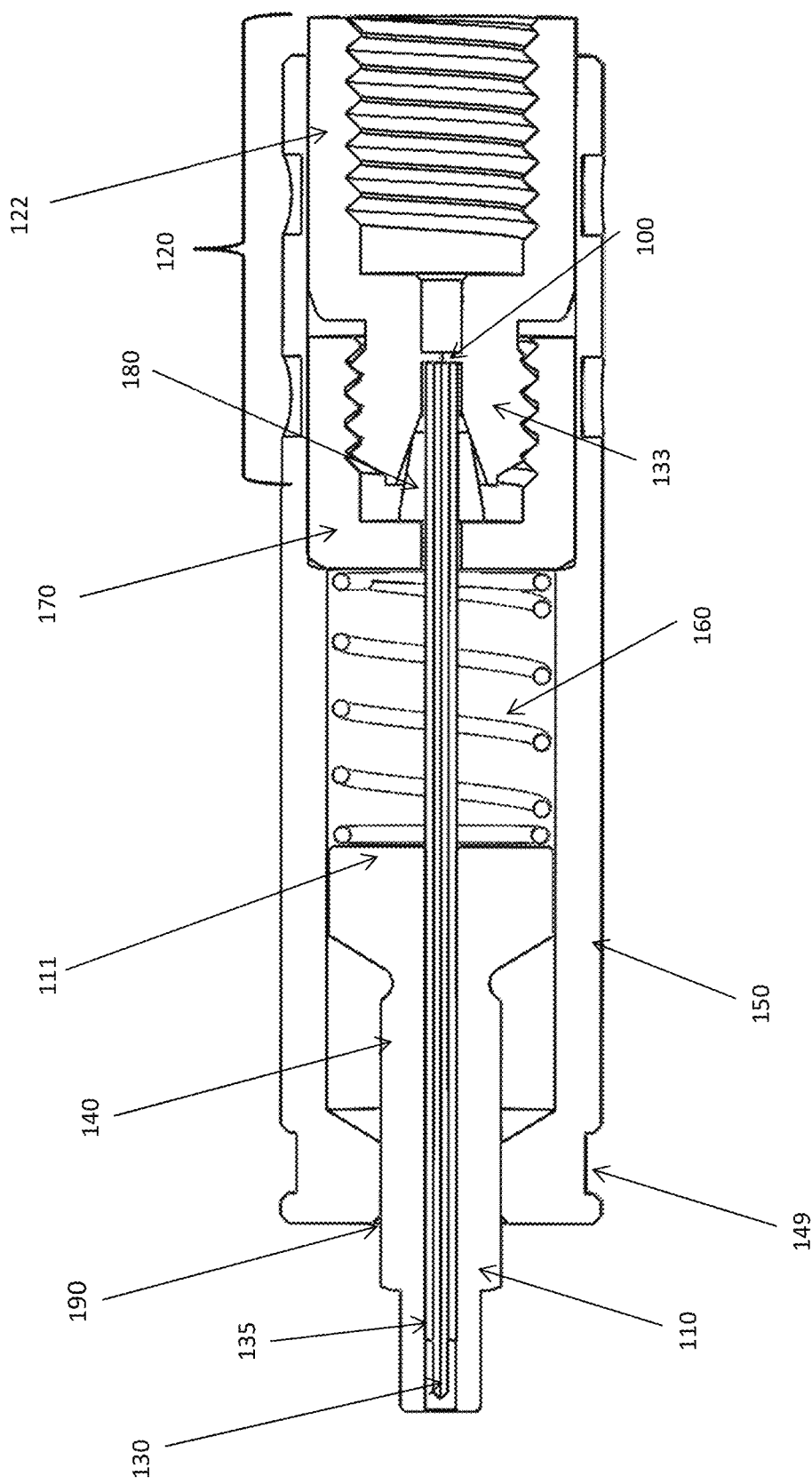
FIG. 1 is a schematic diagram of cross-sectional side view of the emitter assembly with a female end fitting, in accordance with one embodiment of the present invention.

FIG. 1 is a schematic diagram of cross-sectional side view of the emitter assembly with a female end fitting, in accordance with one embodiment of the present invention. The embodiment shown in FIG. 1 includes an electrospray emitter 130 held in place with PEEK sleeve 135, cap nut 170 and ferrule 180. The emitter is typically a fused silica, metal, glass, or ceramic needle or capillary as known in the LCMS community. The fitting for the emitter is a conventional type for coupling capillary tubing. A LC column with a threaded male end can be connected to the threaded female inlet on the opposite side of the emitter in union 120.

At or near the inlet of the emitter 130, a stop 100 is integrated into the union 120 with a defined through hole to ensure a proper voltage application to the liquid entering the emitter. The other side of the union 120 is a fitting for receiving a number of standard capillary connections. The union 120 includes an externally threaded side 133 and a threaded inlet side 122.

A protective sleeve 140 of generally cylindrical form is slidably located on the emitter 130. The sleeve 140 has a main body 110 and a base 111 of a wider diameter than the main body. The protective sleeve 140 is generally made of plastic. A PEEK sleeve 135 covers at least a central portion of the emitter 130 and is adapted to closely fit between an outer diameter of the emitter 130 and the protective sleeve 140. Mounted around the protective sleeve 140, in one embodiment, is an electrically conductive sheath 150. The conductive sheath is supported at one end by the cap nut 170. The sheath may be detached from the column fittings at that end. The conductive sheath 150 has an internal diameter such as to accommodate therein the protective sleeve 140 and permit the protective sleeve 140 to slidably move in a reciprocating manner inside the sheath, described in further detail below.

A resilient member or spring 160 is provided inside the electrically conductive sheath 150, positioned in a space between the emitter fittings and the protective sleeve 140, thereby to act upon the base of the protective sleeve. In this way, the spring 160 biases the sleeve 140 to force it out of the conductive sheath 150. The length of the sleeve 140 and its extension out of the sheath is sufficient to cover the tip of the emitter 130 and act to protect it against damage. A part of the main body 110 of the protective sleeve 140 protrudes outside the sheath 150 and thereby covers the emitter. The extent of travel of the sleeve 140 out of the sheath 150 is restricted by a reduced internal diameter part 190 at the end of the sheath 150 that stops the wider diameter base 111 of the sleeve. If a force is applied to the sleeve to push the sleeve backwards into the sheath 150 the spring 160 becomes compressed and the tip of the emitter becomes exposed and ready for use. The electrically conductive sheath 150 has a recess in the form of a circumferential groove 149 in its outer surface for the purpose of making contact with a high voltage contact, e.g. a contact ball, as described further below.

In some embodiments, the protective sleeve is fixed with respect to the emitter. However the protective sleeve may also be retractable with respect to the emitter. Where the sleeve is retractable, this ensures that the emitter tip is exposed when in use and thereby the sleeve does not interfere, for example, with gas flows and equipotential lines around the emitter tip. Moreover, a retractable sleeve, when in use, does not block visibility of the emitter so one can readily monitor the spray. In some embodiments, the protective sleeve is slidably located on the emitter. In this case, the protective sleeve is movable between an extended (or cover) position wherein it covers the emitter, especially the tip thereof, and a retracted position wherein the emitter, especially the tip thereof, is exposed. When the emitter is exposed it may be used for electrospray ionization. The emitter tip herein means the tip from which ions are produced when in use. The protective sleeve thus covers and supports the electrospray emitter along at least a portion of its axis which includes the tip of the emitter.

In some embodiments, the protective sleeve comprises a generally cylindrical body that surrounds and supports the emitter. The generally cylindrical body may comprise a base of greater diameter than a remainder or main body of the sleeve. The resilient member (e.g., a spring) is provided in contact with the protective sleeve, to bias the sleeve towards its extended position. The resilient member is in contact with a base of the protective sleeve and positioned between a connection fitting and the protective sleeve. In this way, the resilient member, upon activation, is able to force the sleeve to cover the emitter when it is required to be protected. The resilient member also allows the sleeve to be retracted from the tip end of the emitter when the emitter is required to be used, e.g. when the emitter assembly is assembled with an instrument for mass spectrometric analysis. To enable this retraction, the resilient member is forced into a compressed state, e.g. by pushing the sleeve towards the resilient member. The resilient member biases the sleeve to the extended position such that the sleeve adopts the extended or cover position when the sleeve does not have a sufficient force applied pushing it against the resilient member. The resilient member or spring thereby enables the protective sleeve to cover the tip end of the emitter when the emitter is not required to be used, e.g. when the emitter assembly is disassembled from an instrument for mass spectrometric analysis.

The protective sleeve may be enclosed within an outer sheath, which in certain aspects of the invention is the electrically conductive sheath described herein. The outer sheath may be fixed in position in relation to the emitter. The protective sleeve is capable of reciprocating motion within the outer sheath, thereby enabling the protective sleeve to be retractable with respect to the emitter. In such embodiments, the resilient member is also provided inside the outer sheath for providing a force against the sleeve, or against the base of the sleeve, to bias the sleeve towards the extended position.

Thus, in embodiments where the protective sleeve is used in combination with the electrically conductive sheath, the resilient member is provided inside the electrically conductive sheath between the fitting and the protective sleeve covering, whereby the spring, upon activation, is able to force the sleeve out of the sheath to cover the emitter. Thus, in certain embodiments, the protective sleeve may be forced out as soon as the system is pulled out of a recipient holder (as described in more detail below), i.e. the spring force is constantly acting so as to push the sleeve in an outwards direction thereby to cover the emitter. In some embodiments, the protective sleeve is made of a rigid material such as a metal or a polymer material. In this way the rigidity of the sleeve can protect the fragile emitter that it covers.

In some embodiments, the separation column is connected via a transfer line or capillary with the electrospray emitter through one or more end fittings. It should be noted that the separation column may be directly coupled or connected with the replaceable emitter through the end fitting, without using a transfer line. The overall design may therefore be made as a convenient "connect-and spray" type, which the user only has to connect the separation column with a finger tight fitting and fit into a receiving frame or holder on an instrument, e.g. for mass spectrometry.

Figure 2:
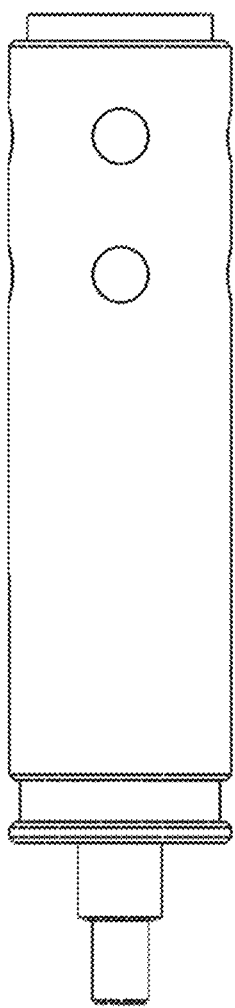
FIG. 2 is an outside view of the emitter assembly of FIG. 1.

FIG. 2 is an outside view of the emitter assembly of FIG. 1, showing the electrically conductive sheath mounted at the front end and the protruding sleeve protecting the emitter (not visible). It will be appreciated from the description that the emitter assembly system may be formed as a type of cartridge for use with a LC separation column and an instrument, e.g. mass spectrometer.

Figure 3:
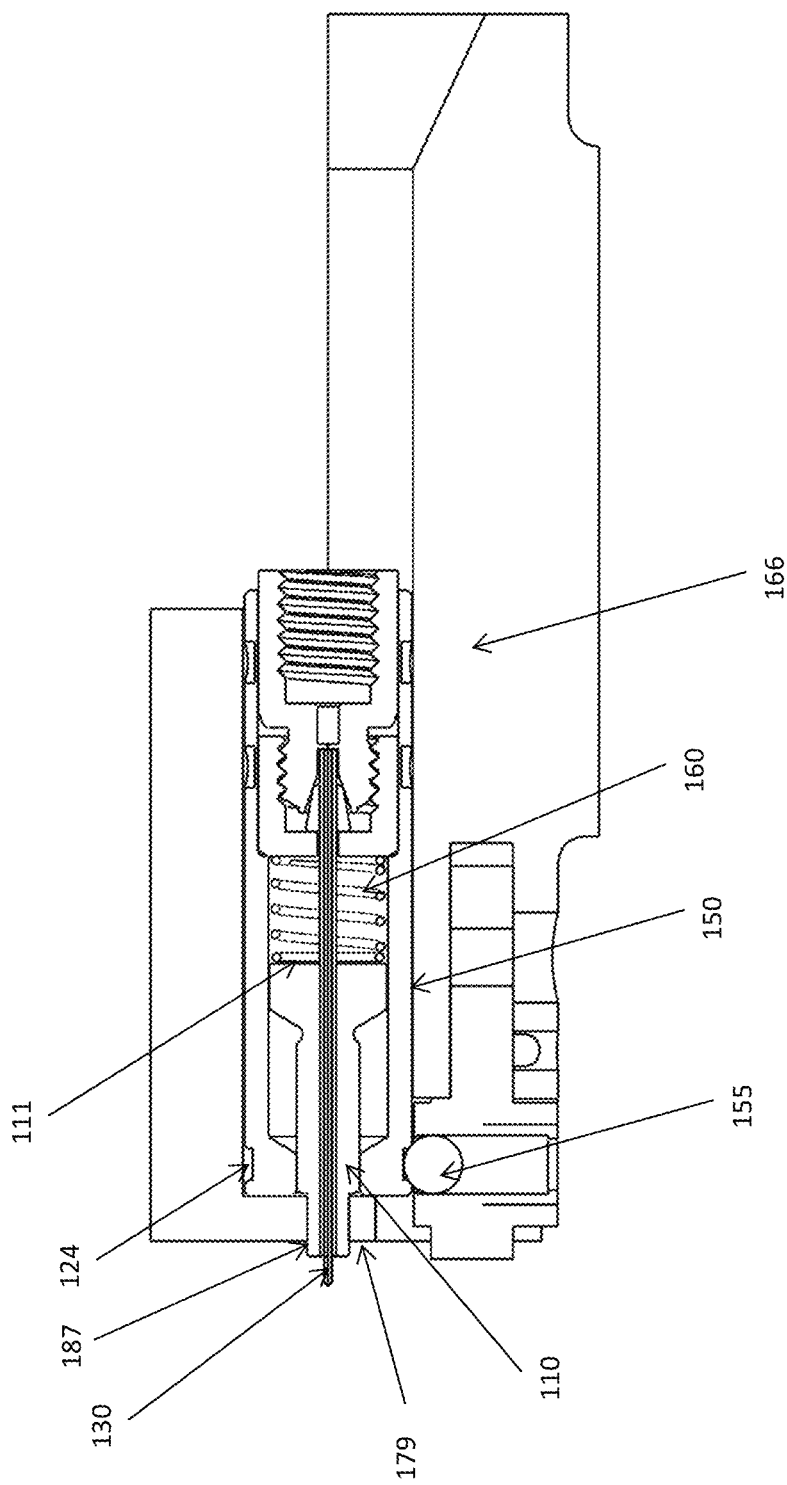
FIG. 3 is a schematic diagram of a cross-sectional side view of the emitter assembly of FIG. 1 inserted in a holder of a mass spectrometer instrument, in accordance with one embodiment of the present invention.

FIG. 3 is a schematic diagram of a cross-sectional side view of the emitter assembly of FIG. 1 inserted in a holder of a mass spectrometer instrument, in accordance with one embodiment of the present invention. As shown in FIG. 3, a holder 166 or adaptor is shown that fits to the outer shape of the electrically conductive sheath 150. The holder 166 may be fixed on the laboratory instrument (e.g. mass spectrometer) that is not shown in the figure. The electrically conductive sheath 150 has an outer shape and provides a close, tight, fit in the receiving holder 166. In this specific embodiment, the electrically conductive sheath 150 has a circular cylindrical outer shape and the holder 166 has a circular cylindrical receiving space to receive the electrically conductive sheath 150.

The electrically conductive sheath may be enclosed within a holder having a high voltage contact point when the emitter assembly is in use. The holder may be located or positioned on an instrument, e.g. for mass spectrometric analysis. The high-voltage contact point may be an electrically conductive ball 155 fitting a recess, such as a groove 124, in the outer surface of the electrically conductive sheath. The groove 124 may be a circumferential groove in the outer surface of the electrically conductive sheath. The contact point may be, for example, a spring loaded ball bearing. The electrically conductive sheath may have a shape that provides a close or tight fit in a receiving holder on a laboratory apparatus (e.g. mass spectrometer). In a specific embodiment, the electrically conductive sheath has a cylindrical, i.e. circular cylindrical, outer shape. In that embodiment, the holder has a cylindrical, i.e. circular cylindrical, receiving space, to receive the electrically conductive sheath of the emitter assembly. In this way, with such cylindrical shaped parts and a groove in the outer surface of the electrically conductive sheath to receive the high voltage contact point, an exact angular alignment of the emitter assembly in the holder is optional. An axial alignment of the emitter assembly in the holder can be achieved by means of providing an appropriate stop within the holder and/or by means of the contact point fitting in the groove in the outer surface of the electrically conductive sheath.

The ball 155 for the high voltage (HV) connection, which also provides a snap-on connection for the electrically conductive sheath 150, can be a spring loaded ball bearing that fits the groove 124 in the outer surface of the electrically conductive sheath 150 and provides the HV connection thereto. Axial alignment of the emitter assembly in the holder 166 is achieved by means of inserting the electrically conductive sheath 150 of the emitter assembly into the holder 166 until the HV ball contact 155 fits in the grove 124 in the outer surface of the electrically conductive sheath and snaps or locks into the assembly into place within the holder 166. The female fitting electrically contacts the electrically conductive liquid (eluent) at the point of entering the through a hole in the stop 100 (FIG. 1) between the emitter inlet and exit of the LC column enabling the transfer of charge from the high voltage contact point to the tip of the emitter.

The emitter assembly also permits simultaneous retraction of the protective sleeve 140 from the emitter tip as the emitter assembly is inserted in the holder 166 to allow the emitter to be used, e.g. in the mass spectrometer. For this purpose, while the emitter 130 and the PEEK sleeve 135 fit through an orifice 179 in the holder 166, the main body 110 of the sleeve 140 does not. The orifice 179 may lead into an ionization chamber, e.g. of a mass spectrometer. In this embodiment, the sleeve 140 has an end portion of reduced diameter 187 compared to its main body 110. In this way, the reduced diameter portion 187 of the protective sleeve fits through the orifice in the holder 166 and may thereby support the emitter in this region.

It will be appreciated that when the integrated assembly is withdrawn from the holder 166, movement of the sleeve 140 will no longer be restricted by the wall surrounding the orifice 179 in the holder 166 such that the spring 160 will force the sleeve 140 out of the sheath 150 once again so as to cover and protect the emitter 130 as shown in FIG. 1.

Figure 4:
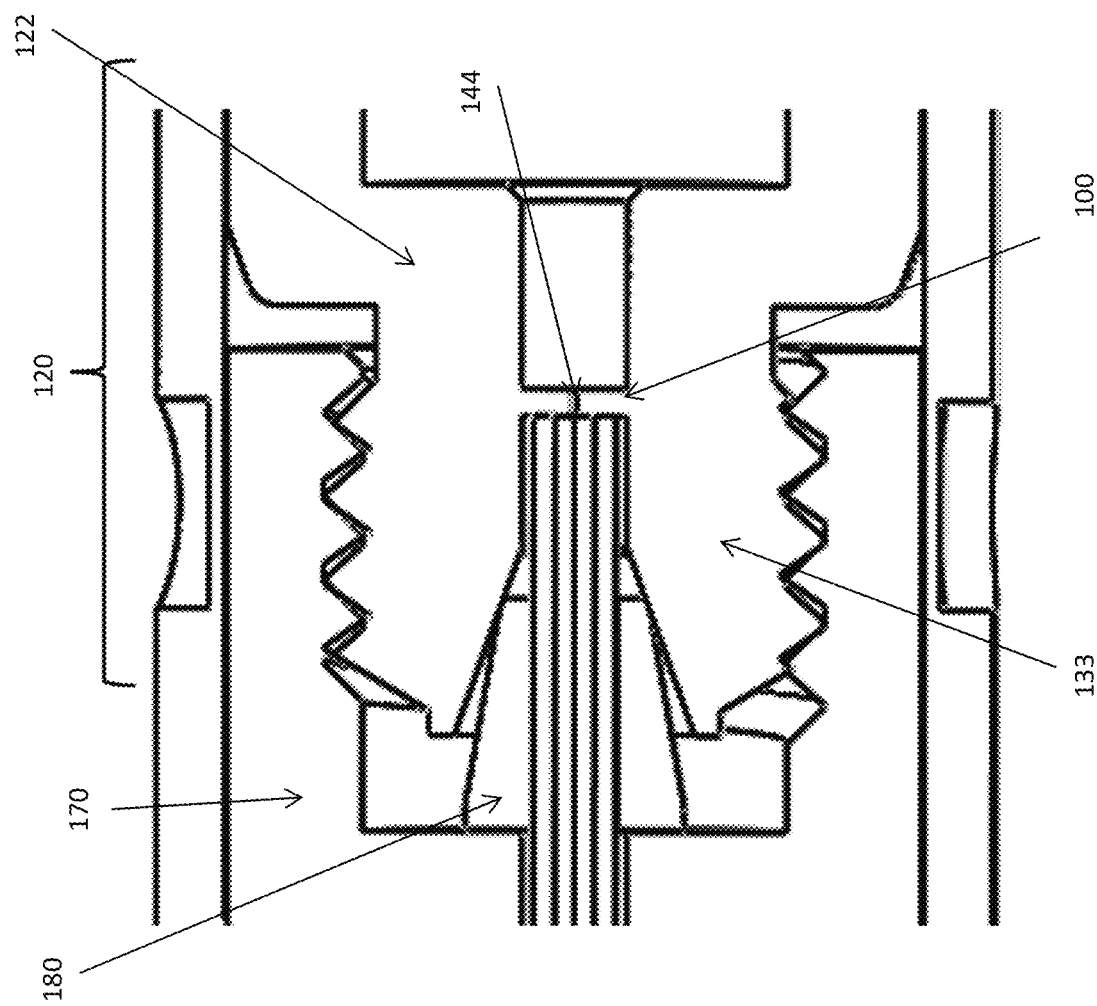
FIG. 4 is a schematic diagram of a cut out section of the emitter assembly of FIG. 1, focusing on the stop integrated into the emitter assembly.

FIG. 4 is a schematic diagram of a cut out section of the emitter assembly of FIG. 1, focusing on the stop integrated into the emitter assembly. The threaded inlet side 122 of the union 120 allows for a standard capillary connection to be pressed against the stop 100. The thread-less side 133 of the union 120 allows for the emitter 130 to be connected to the outlet side of the stop 100. The emitter is held in place with cap nut 170 and ferrule 180. The defined through hole 144 in the stop 100 allows for the liquid (e.g., from the separation column) to come into contact with the union 120 and completes the electrical path from the HV ball contact 155 to the tip of the emitter 130. This pathway ensures that there is no loss in electrical application negatively affecting the electro spray.

Figure 5:
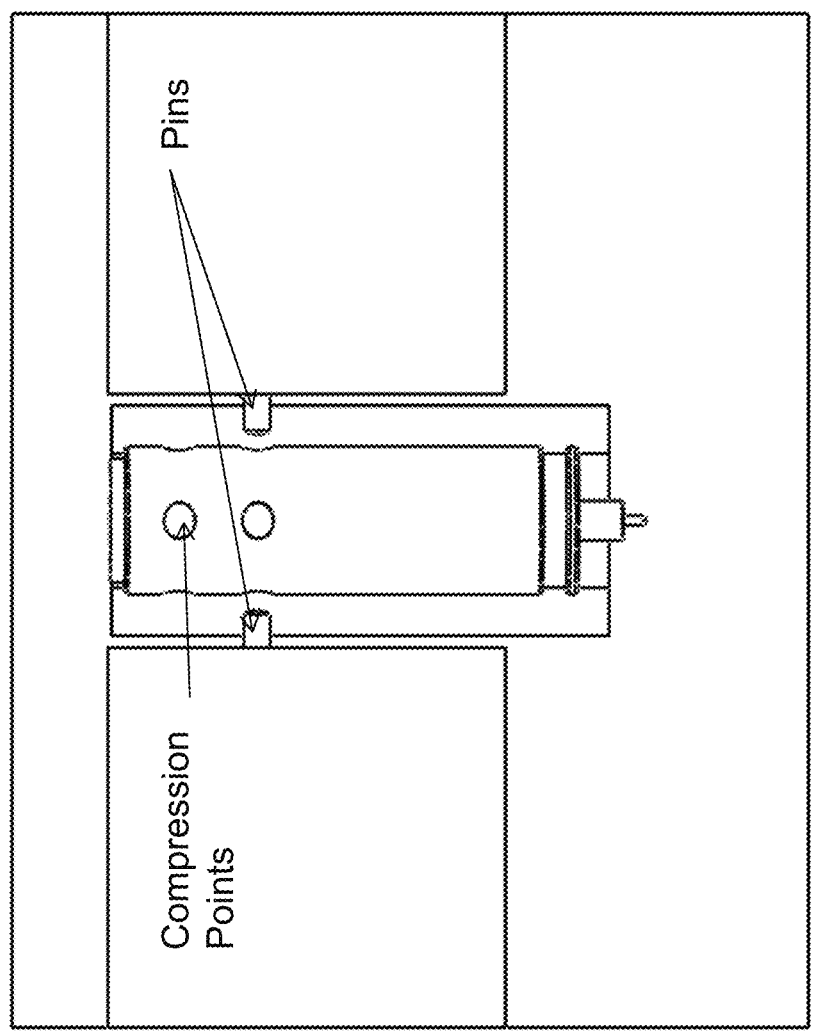
FIG. 5 shows the emitter assembly in a pinning fixture before the emitter body is pinned to the union.
Figure 6:
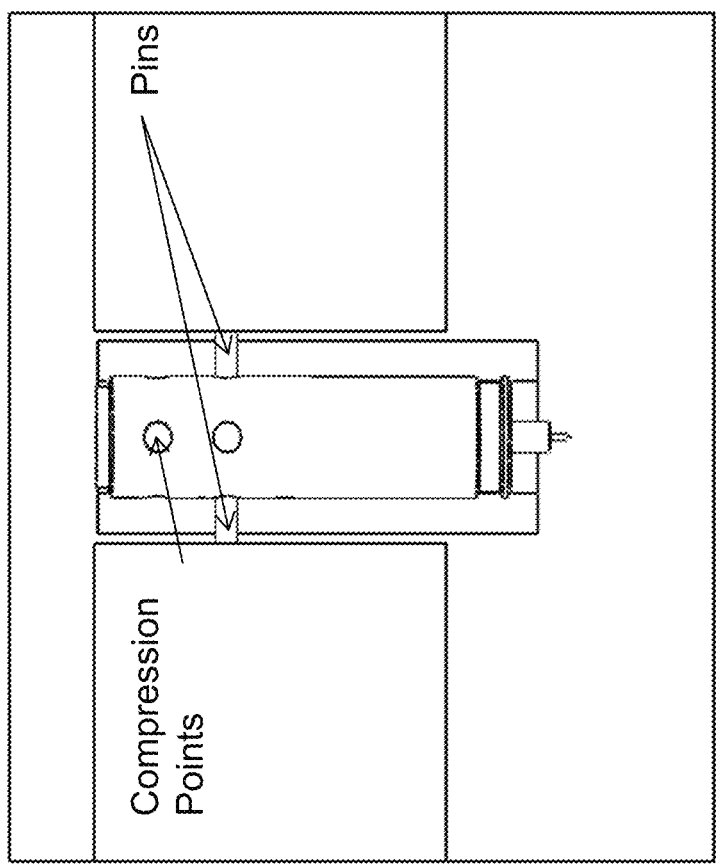
FIG. 6 shows the emitter assembly in a pinning fixture as the pins are actively connecting the emitter body and the emitter union.

FIG. 5 shows the emitter assembly in a pinning fixture before the emitter body is pinned to the union. FIG. 6 shows the emitter assembly in a pinning fixture as the pins are actively connecting the emitter body and the emitter union.

The pins, which may be activated by compressed air, are pressed against a wall of the body where the indentations or compression points are located. After the pins press against these spots and deform the body, the pins retract to the starting position. The assembly is rotated approximately 90° and the same action occurs. In one embodiment, the pins are not added to the assembly and the deformation binds 150 (FIG. 1) and 170 (FIG. 1) together.

Fittings as used for the present invention may be any fittings for LC. The fittings may be constructed from a wide range of polymer materials or made from a range of metals. For the purpose of making electrical contact between an electrospray potential as described herein, it is advantageous that the fitting materials be conductive.

Fittings may include ferrules or gaskets that provide a seal between the body of the fitting and the conduits that are to be connected. To solidify the electrical connection between the outlet of the LC column to the inlet of the emitter, the fitting contains an integrated stop in the union. The union is comprised of a conductive material such as stainless steel to ensure a good electrical path through the union to the liquid or eluent. The thickness of the integrated stop is from 0 to 1 mm with a preferred thickness of between 100 μm to 300 μm. A hole is placed in the stop to allow a path for the liquid to flow from the exit of the LC column to the inlet of the emitter. The diameter of this hole in the stop is between 1 μm and the outside diameter of the sleeve covering the emitter with a preferred diameter of 3 μm to 100 μm. In some embodiments, the through hole is disposed at or near the middle of the stop. However, the through hole may be disposed at any portion of the stop.

The electrospray emitter as used for the present invention may be of any construction. The electrospray emitter may be made of fused silica, metal, glass, or ceramic tubing, which may end in a sharp or blunt tip. It is usually preferable to have a sharp and tapered tip such as that obtained when using an automated capillary puller (e.g. from Sutter instrument, Inc., Novato, Calif., USA) since such emitters provide a more stable spray than blunt emitters do. Typically such tapered emitters have an outer diameter of about 360 μm and an inner diameter of 5 μm to 100 μm whereas the orifice at the tapered tip is usually around 1 μm to 20 μm. The length of such emitters is usually between 30 mm and 60 mm but may also be longer or shorter.

The electrospray emitter assembly allows a user to connect the emitter to any standard fitting such as, but not limited to, a 10/32 fitting for UHPLC. The electrospray emitter utilizes the retractable protective sleeve for covering and supporting the electrospray emitter along a portion of its access. Attached to the end of the emitter is a plug unit and connection system for connecting capillary tubes for high performance liquid chromatography.

Some embodiments of the present invention use stainless steel emitters that have an outer diameter between 100 μm and 500 μm and an inner diameter between 5 μm and 100 μm. Some embodiments of the present invention use polished fused silica glass emitters that have an outer diameter between 100 μm and 500 μm and an inner diameter between 2 μm and 100 μm.

Figure 7:
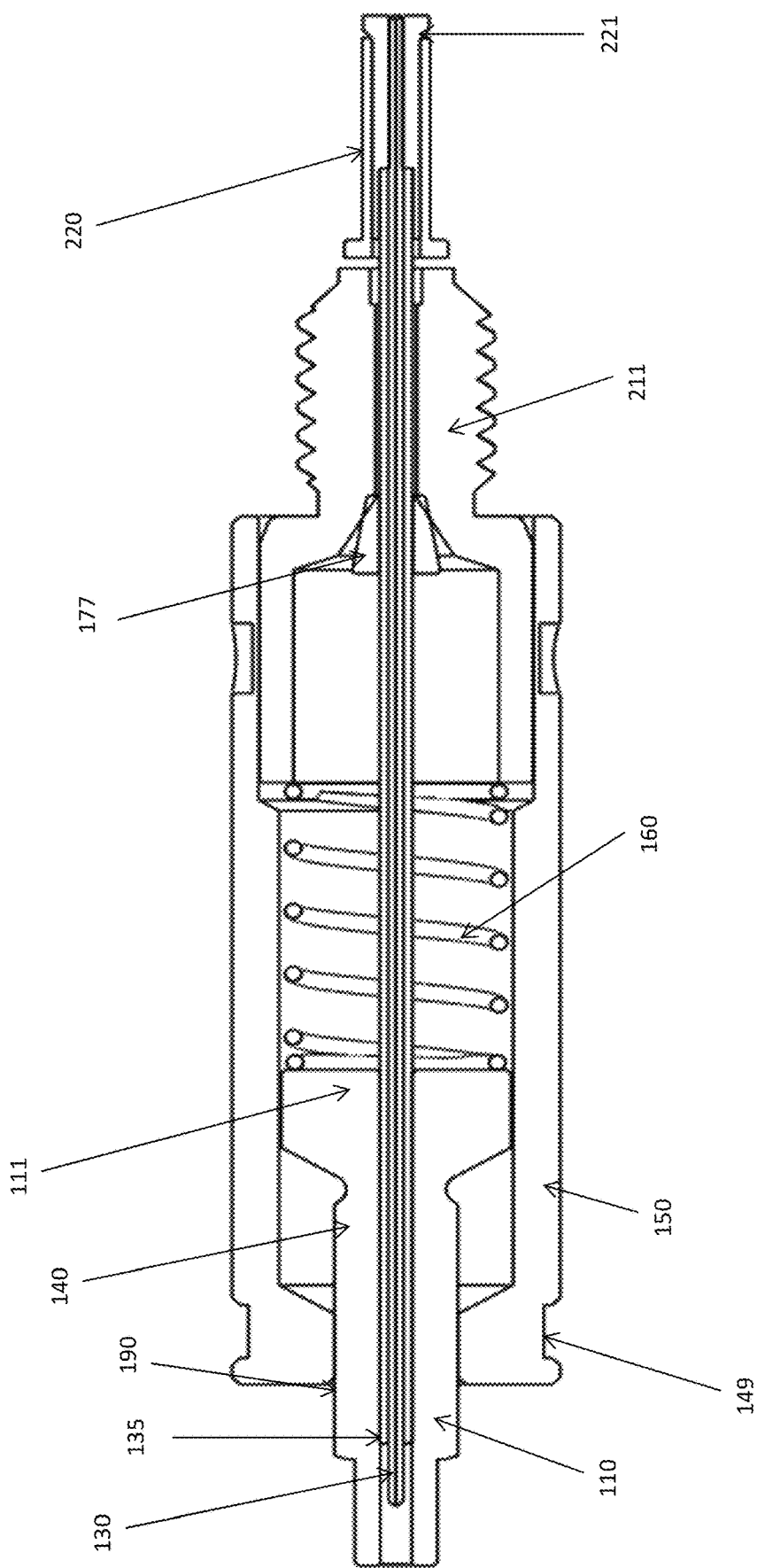
FIG. 7 is a schematic diagram of cross-sectional side view of the emitter assembly with a plug type end fitting, in accordance with one embodiment of the present invention.

FIG. 7 is a schematic diagram of cross-sectional side view of the emitter assembly with a plug type end fitting, in accordance with one embodiment of the present invention. The arrangement shown in FIG. 7 comprises an electrospray emitter 130 inserted or threaded through the PEEK sleeve 135 of the emitter 130 and held in place with ferrule 177 and metal sleeve 220. PEEK sleeve 221, together with metal sleeve 220, facilitates connection of a fitting, such as a nanoViper™ fitting, at an inlet of the emitter 130. The emitter may comprise a fused silica, metal, ceramic, or glass needle or capillary as known in the LCMS community. The emitter is held in place with a plug type capillary fitting and can be connected to a LC column by a threaded or press fit.

A protective sleeve 140 of generally cylindrical form is slidably located on the emitter 130 in the PEEK sleeve 135. The protective sleeve 140 has a main body 110 and a base 111 of a wider diameter than the main body. The protective sleeve 140 is generally made of plastic. Mounted around the protective sleeve 140, in some embodiments, is an electrically conductive sheath 150 made of metal. The conductive sheath is supported at one end by the threaded fitting 211 which is made of metal. The sheath 150 may be detached from the column fittings at that end. The conductive sheath 150 has an internal diameter such as to accommodate therein the protective sleeve 140 and permit the protective sleeve 140 to slidably move in a reciprocating manner inside the sheath as described below.

A spring 160 is provided inside the electrically conductive sheath 150, positioned in a space between the emitter fittings and the protective sleeve 140, thereby to act upon the base of the protective sleeve 140. In this way, the spring 160, biases the sleeve 140 to force it out of the conductive sheath 150. The length of the sleeve 140 and its extension out of the sheath is sufficient to cover the tip of the emitter 130 and act to protect it against damage. A part of the main body 110 of the protective sleeve 140 protrudes outside the sheath 150 and thereby covers the emitter. The extent of travel or movement of the sleeve 140 out of the sheath 150 is restricted by a reduced internal diameter part 190 at the end of the sheath 150 that stops the wider diameter base 111 of the sleeve. When a force is applied to the sleeve to push the sleeve backwards into the sheath 150 the spring 160 becomes compressed and the tip of the emitter becomes exposed and ready for use as described in more detail below.

The electrically conductive sheath 150 has a recess in the form of a circumferential groove 149 in its outer surface for the purpose of making contact with a high voltage contact, e.g. a contact ball, as described further below.

Figure 8:
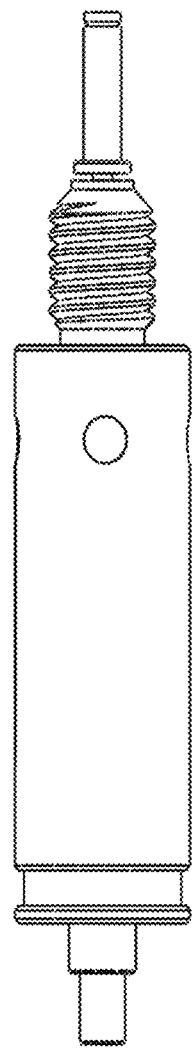
FIG. 8 is an outside view of the emitter assembly of FIG. 7.

FIG. 8 shows the arrangement of FIG. 7 from the outside showing the electrically conductive sheath mounted at the front end and the protruding sleeve protecting the emitter (not visible). It will be appreciated from the description that the whole emitter assembly is thus formed as a type of cartridge for use with a LC separation column and an instrument, e.g. mass spectrometer.

Figure 9:
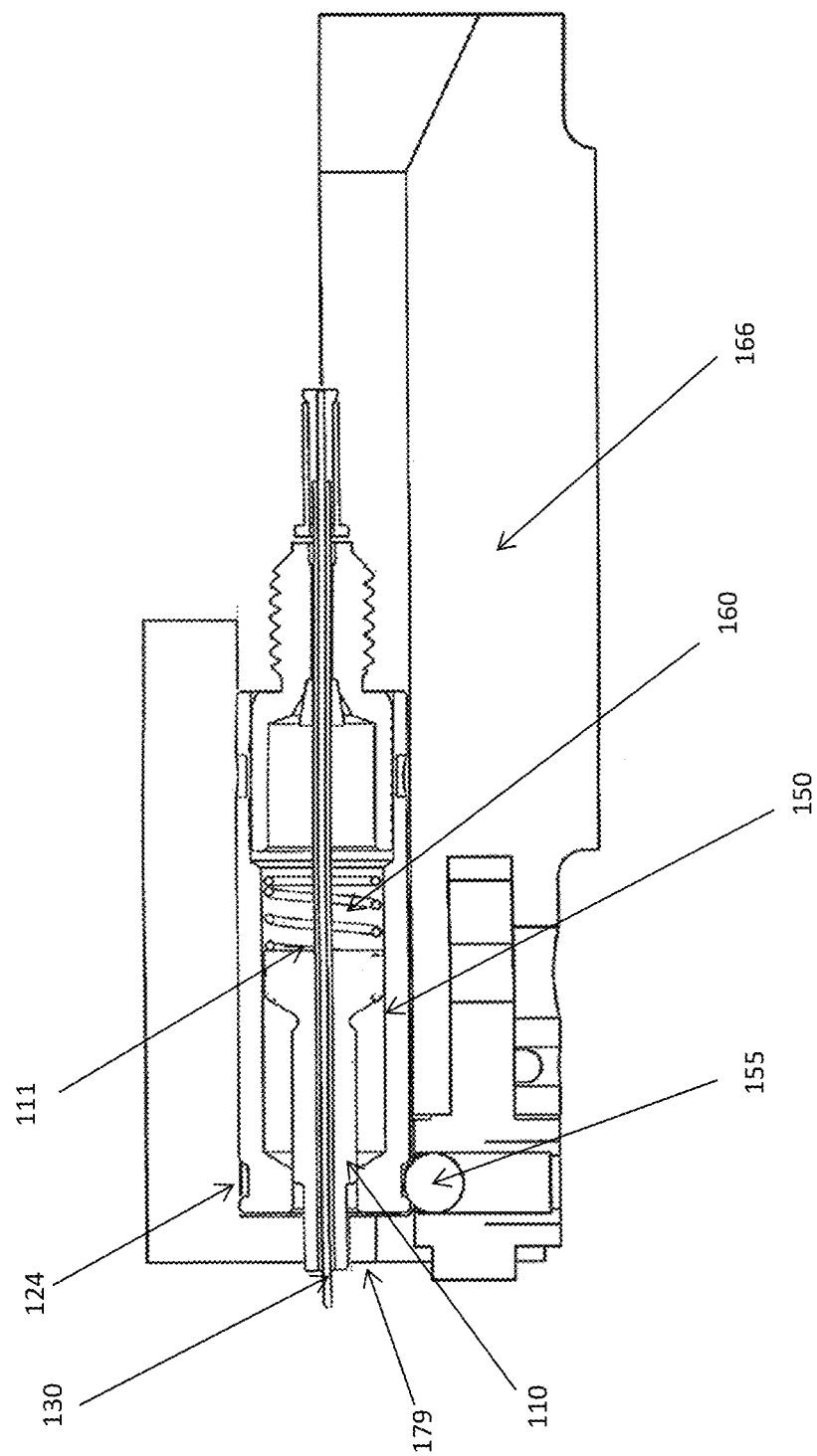
FIG. 9 is a schematic diagram of a cross-sectional side view of the emitter assembly of FIG. 7 inserted in a holder of a mass spectrometer instrument, in accordance with one embodiment of the present invention.

FIG. 9 is a schematic diagram of a cross-sectional side view of the emitter assembly of FIG. 7 inserted in a holder of a mass spectrometer instrument, in accordance with one embodiment of the present invention. As shown in the figure, a holder 166 or adaptor is shown that fits to the outer shape of the electrically conductive sheath 150 which encloses the protective sleeve 140 and provides an electrical connection. The holder 166 may be fixed on the laboratory instrument (e.g. mass spectrometer) that is not shown in the figure. The electrically conductive sheath 150 has an outer shape and provides a close, tight, fit in the receiving holder 166. In this specific embodiment, the electrically conductive sheath 150 has a circular cylindrical outer shape and the holder 166 has a circular cylindrical receiving space to receive the electrically conductive sheath 150.

A ball 155 for the high voltage (HV) connection, which also provides a snap-on connection for the electrically conductive sheath 150, is also shown. The ball 155 may be a spring loaded ball bearing that fits the groove 124 in the outer surface of the electrically conductive sheath 150 and provides the HV connection there to. Axial alignment of the emitter assembly in the holder 155 may be achieved by means of inserting the electrically conductive sheath 150 of the emitter assembly into the holder 166 until the HV ball contact 155 fits in the grove 124 in the outer surface of the electrically conductive sheath and snaps or locks into the assembly into place within the holder 166. The electrically conductive sheath 150 encloses and electrically contacts the threaded fitting 211 that, along with the metal sleeve fitting 220 and PEEK sleeve 221, connects the emitter to an upstream LC column. The fitting electrically contacts the emitter with the fitting on the outlet of the LC column. As the liquid (eluent) exits the LC column it is electrically charged as it enters the electrospray emitter 130.

The emitter assembly also permits simultaneous retraction of the protective sleeve 140 from the emitter tip as the emitter assembly is inserted in the holder 166 to allow the emitter to be used, e.g. in the mass spectrometer. For this purpose, while the emitter 130 fits through an orifice 179 in the holder 166, the main body 110 of the sleeve 140 does not. The orifice 179 may lead into an ionization chamber, e.g. of a mass spectrometer. In this embodiment, the sleeve 140 has an end portion 187 (FIG. 3) of reduced diameter compared to its main body 110. In this way, the reduced diameter portion 187 of the protective sleeve fits through the orifice 179 in the holder 166 and may thereby support the emitter in this region.

It will be appreciated that when the emitter assembly is withdrawn from the holder, the travel or movement of the sleeve 140 will no longer be restricted by a wall surrounding the orifice 179 in the holder 166 such that the spring 160 will force the sleeve 140 out of the sheath 150 once again so as to cover and protect the emitter 130 as shown in FIG. 7.

Example 1. Assemble the Female Type Emitter Assembly with 7 μm ID Emitter

An integrated emitter assembly having the structure shown in FIG. 1 was assembled, which has a female type end fitting. The emitter was made from a fused silica capillary with 7 μm ID and 150 μm OD. The emitter outlet was polished to a sharp point. The emitter length is 30 mm. The female type end fitting is compatible with the plug type capillary fitting. The female union has a 250 um stop with a through hole of 50 μm ID between the emitter entrance and the plug type capillary fitting (See FIG. 10, which is a close up view of part of the emitter assembly of FIG. 1, and table 1 for a description of the union and emitter). FIG. 11 is an example of the assembled emitter and nano/capillary column, in accordance with one embodiment of the present invention.

TABLE 1

Figure 10:
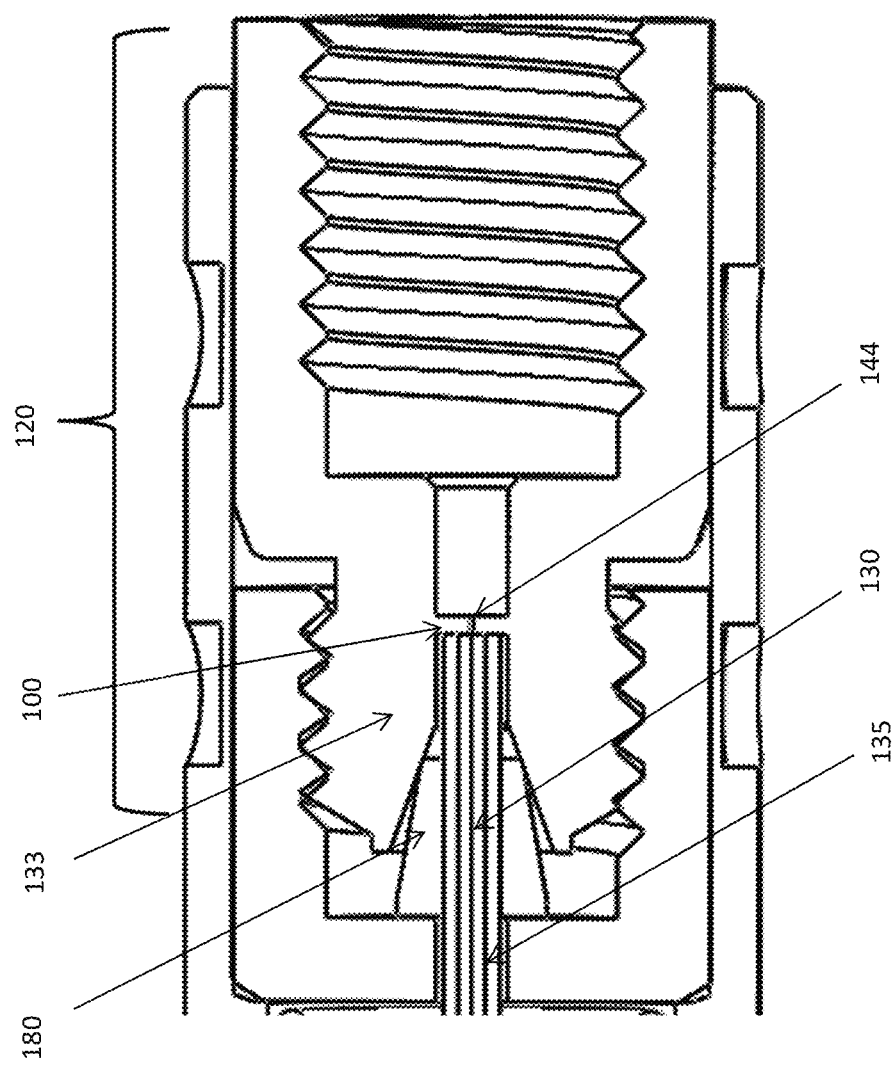
FIG. 10 is a close up view of part of the emitter assembly of FIG. 1.
Figure 11:
FIG. 11 is an example of an emitter assembly, similar to FIG. 1, coupled with a nano- or capillary column, in accordance with one embodiment of the present invention.

Details for FIG. 10 in Example 1.

| Element Number in FIG. 10 | Dimensions |
|---|---|
| 100 | Length: 0.25 mm |
| 144 | ID: 0.05 |
| 120 | $^{10}/_{32}$" Threading, Length: 8 mm |
| 180 | PEEK ferrule |
| 130 | Fused Silica, ID: 7 μm, OD: 150 μm, Length: 30 mm |
| 133 | Ferrule Seat in Union, $^{8}/_{32}$" Threading |
| 135 | PEEK tubing, OD $^{1}/_{32}$", ID 180 μm, Length 26 mm |

The replaceable emitter assembly was assembled by first inserting the emitter into the protective PEEK sleeve. The nut and ferrule were then place over the PEEK sleeve and inserted into the male end of the union. The ferrule was set into the union to prevent the emitter from moving. The emitter was then threaded through the spring, sliding emitter protector and emitter casing. The casing is then attached to the nut and union by pressing on the pin points of the casing.

Example 2. Assemble the Female Type Emitter Assembly with 15 μm ID Emitter

An integrated emitter assembly having the structure shown in FIG. 1 was assembled, which has a female type end fitting. The emitter was made from a fused silica capillary with 15 μm ID and 150 μm OD. The emitter outlet was polished to a sharp tip. The emitter length is 30 mm. The female type end fitting is compatible with the plug type capillary fitting. The female union has a 250 um stop with a through hole of 50 μm ID between the emitter entrance and the plug type capillary fitting (see FIG. 10 and table 2 for a description of the union and emitter). FIG. 11 is an example of the assembled emitter and nano/capillary column.

TABLE 2

Details for FIG. 10 in Example 2.

| Element Number in FIG. 10 | Dimensions |
|---|---|
| 100 | Length: 0.25 mm |
| 144 | ID: 0.05 mm |
| 120 | $^{10}/_{32}$" Threading, Length: 8 mm |
| 180 | PEEK ferrule |
| 130 | Fused Silica, ID: 15 μm, OD: 150 μm, Length: 30 mm |
| 133 | Ferrule Seat in Union, $^{8}/_{32}$" Threading |
| 135 | PEEK tubing, OD $^{1}/_{32}$", ID 180 μm, Length 26 mm |

Example 3. Assemble the Male Type Emitter Assembly with 20 μm ID Emitter

Figure 13:
FIG. 13 is an example of an emitter assembly, similar to FIG. 7, coupled with a capillary column, in accordance with one embodiment of the present invention.
Figure 14:
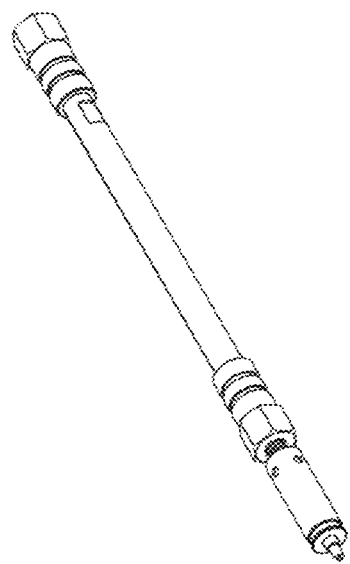
FIG. 14 is an example of an emitter assembly, similar to FIG. 7, coupled with a micro- or analytical column, in accordance with one embodiment of the present invention.

An integrated emitter assembly having the structure shown in FIG. 7 was assembled, which has a male type end fitting. The emitter was made from a fused silica capillary with 20 μm ID and 150 μm OD. The emitter outlet was polished to a sharp tip. The emitter length is 47 mm. The emitter inlet has a plug type capillary fitting. The emitter was protected by the retractable sheath and the metal cartridge (See FIG. 12, which is a close up view of part of the emitter assembly, and Table 3 for a description of the union and emitter). FIG. 13 and FIG. 14 are examples of the assembled emitter with a capillary and micro/analytical column, respectively.

TABLE 3

Figure 12:
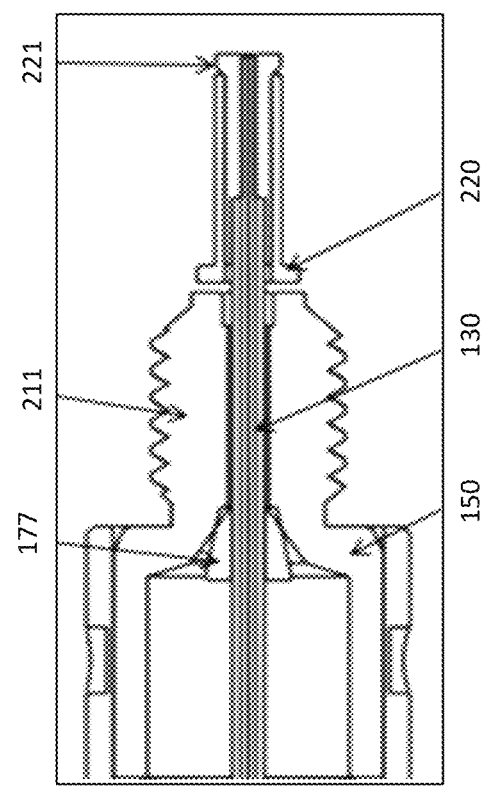
FIG. 12 is a close view of part of the emitter assembly of FIG. 7.

Details for FIG. 12 in Example 3.

| Element number in FIG. 12 | Dimensions |
|---|---|
| 221 | PEEK, OD: 1.15 mm, ID: 0.79 mm, Length: 6.3 mm |
| 220 | Stainless Steel, OD: 1.6 mm, ID: 1.2 mm, Length: 6.3 mm |
| 211 | $^{10}/_{32}$" Threading, Length: 8 mm |
| 177 | PEEK ferrule |
| 130 | Fused Silica, ID: 20 μm, OD: 150 μm, Length: 47 mm |
| 150 | Ferrule Seat in Union, $^{8}/_{32}$" Threading |
| 135 | PEEK tubing, OD $^{1}/_{32}$", ID 180 μm, Length 43 mm |

The replaceable emitter assembly was assembled by first inserting the emitter into the protective PEEK sleeve. The plug type capillary fitting was then attached to the PEEK sleeve. The emitter was then threaded though the bolt and a ferrule was set on the opposite side of the plug fitting. The emitter was then threaded through the spring, sliding emitter protector and emitter casing. The casing is then attached to the bolt head by pressing on the pin points of the casing.

Example 4. Assemble the Male Type Emitter Assembly with 30 μm ID Emitter

An integrated emitter assembly having the structure shown in FIG. 7 was assembled, which has a male type end fitting. The emitter was made from a stainless steel capillary with 30 μm ID and 150 μm OD. The emitter outlet was tapered with a sharp tip. The emitter length is 47 mm. The emitter inlet has a plug type capillary fitting and then the whole emitter body was protected by the retractable sheath and the metal cartridge (See FIG. 12 and Table 4 for a description of the union and emitter). FIG. 13 and FIG. 14 are examples of the assembled emitter with a capillary and micro/analytical column, respectively.

TABLE 4

Details for FIG. 12 in Example 4.

| Element number in FIG. 12 | Dimensions |
| --- | --- |
| 221 | PEEK, OD: 1.15 mm, ID: 0.79 mm, Length: 6.3 mm |
| 220 | Stainless Steel, OD: 1.6 mm, ID: 1.2 mm, Length: 6.3 mm |
| 211 | 10/32" Threading, Length: 8 mm |
| 177 | PEEK ferrule |
| 130 | Stainless Steel, ID: 30 µm, OD: 150 µm, Length: 47 mm |
| 150 | Ferrule Seat in Union, 8/32" Threading |
| 135 | PEEK tubing, OD 1/32", ID 180 µm, Length 43 mm |

Example 5. BSA Tryptic Digest Analysis Using a 50 µm ID Column Coupling with the Female Type Emitter Assembly Assembled in Example 1

To assess the function of the emitter assembly assembled in Example 1, a nanoflow column, as shown in FIG. 11, was connected to the emitter assembly to analyze BSA tryptic digest.

The nano column was 50 µm ID and 15 cm long and was packed with PepMap™ C18, 2 µm media (Thermo Fisher Scientific, Waltham, Mass., USA). Both ends of the nano-flow column had plug type capillary fittings designed for convenience of use and low dead volume connection between the emitter and nano HPLC system. LTQ XL™ mass spectrometer (MS) (Thermo Fisher Scientific, Waltham, Mass., USA) was used as the detector with an EASY-Spray™ ion source. The LC flow rate was set to 300 nL/min.

Figure 15:
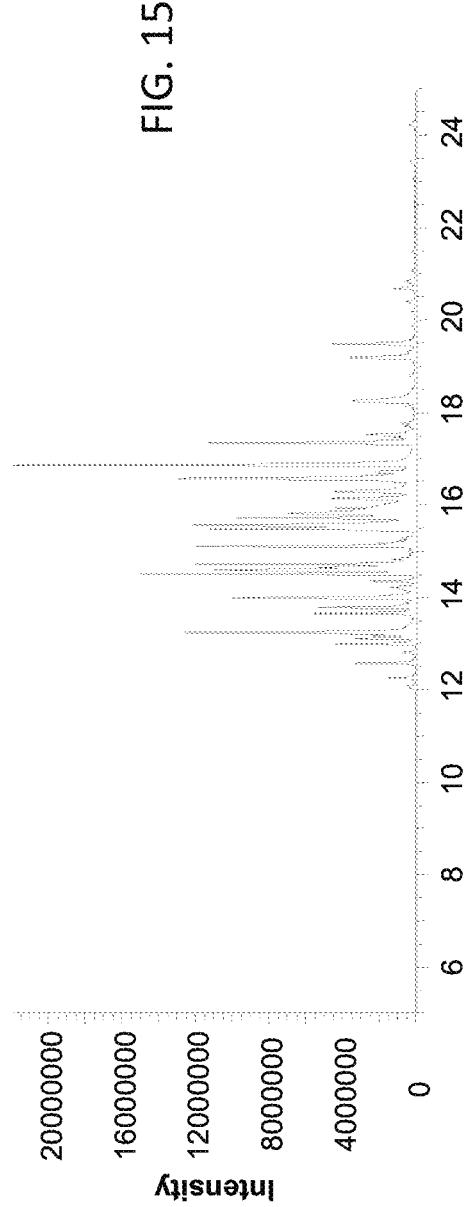
FIG. 15 shows a base peak chromatogram of the BSA tryptic digest analyzed using a 50 μm inner diameter column coupled with the female type emitter assembly described in Example 1.
Figure 16:
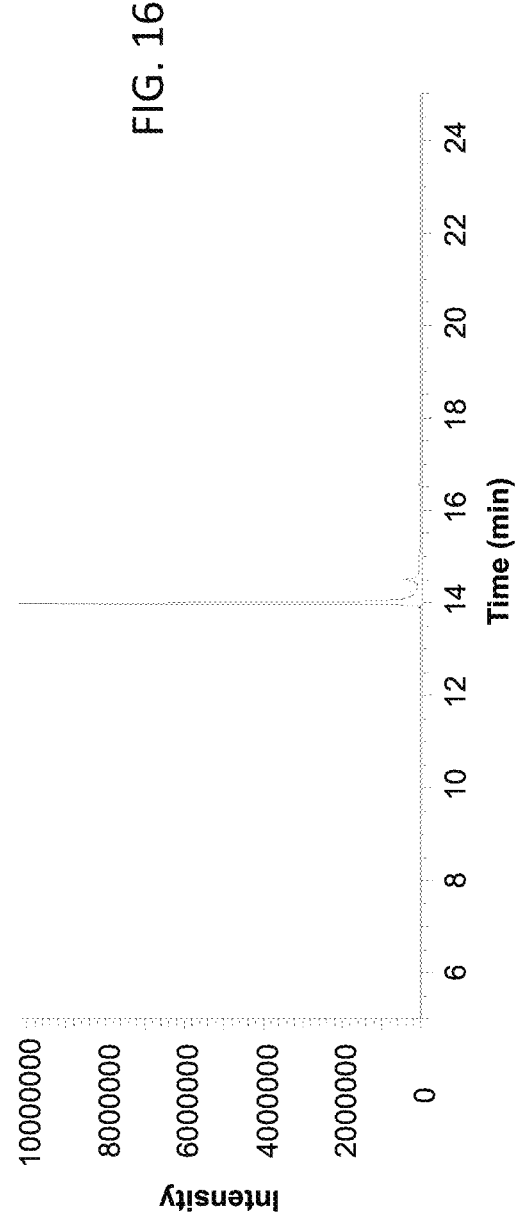
FIG. 16 shows the extracted ion chromatogram of ion with m/z 722.

The LC-MS running conditions include the following:
Nano HPLC system: UltiMate™ 3000 RSLCnano system (Thermo Fisher Scientific, Waltham, Mass., USA) with a nano-flow selector
Flow rate: 300 nL/min
Mobile phase A: 0.1% formic acid in water
Mobile phase B: 0.1% formic acid in acetonitrile
Gradient: 2-40% mobile phase B in 15 min, then 40-95% mobile phase B in 5 min, and keep 95% mobile phase B for 5 min
Injection sample amount: 100 fmol BSA digest
Temperature: ambient
MS instrument: LTQ XL™ MS with EASY-Spray™ ion source
Spray voltage: 1.9 kV
FIG. 15 shows a base peak chromatogram of the separation, and FIG. 16 shows the extracted ion chromatogram of ion with m/z 722. The peak retention time is 14 min. The peak width at half height (PWHH) is 2.36 seconds. The peak asymmetry factor (10% peak height) is 1.82.

Example 6. BSA Tryptic Analysis Using 75 µm ID Column Coupling with the Female Type Emitter Assembly, Assembled in Example 1

A column with 75 µm ID and 15 cm long was also used to test the emitter assembly, assembled in Example 1. The column was packed with PepMap™ C18, 2 µm media. Plug type capillary fittings were attached at both ends of the column for convenience and a low dead volume connection with the emitter and nano HPLC system. The column outlet was connected with the emitter assembly as shown in FIG. 11, which will be inserted in an EASY-Spray™ ion source mounted on a LTQ XL™ mass spectrometer for MS detection. The column inlet connected to a nano HPLC instrument, and the flow rate was 300 nL/min.

Figure 17:
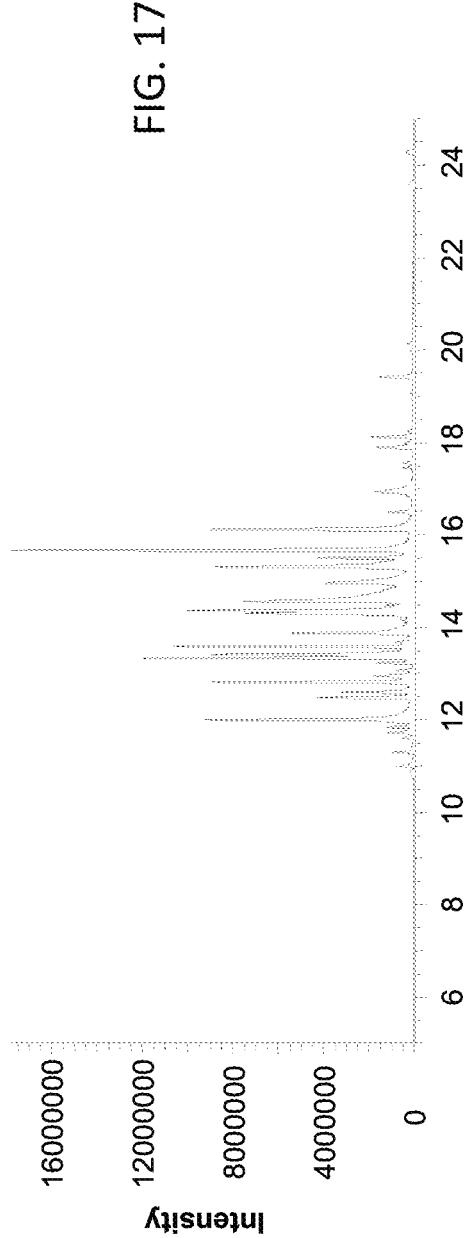
FIG. 17 shows a base peak chromatogram of the BSA tryptic digest analyzed using a 75 μm inner diameter column coupled with the female type emitter assembly described in Example 1.
Figure 18:
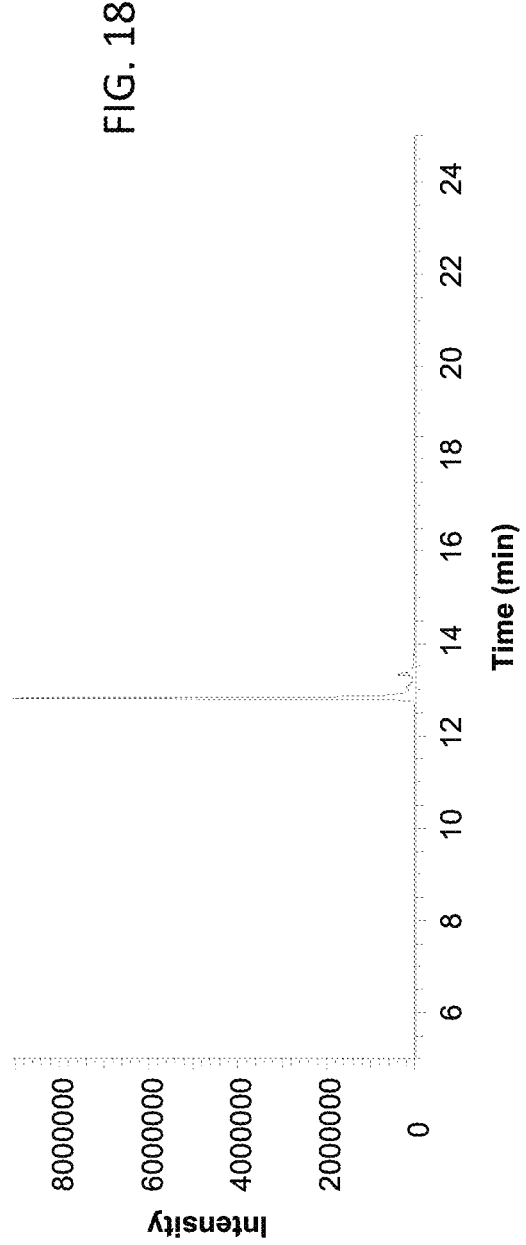
FIG. 18 shows the extracted ion chromatogram of ion with m/z 722.

The LC-MS running conditions include the following:
Nano HPLC system: UltiMate™ 3000 RSLCnano system with a nano-flow selector
Flow rate: 300 nL/min
Mobile phase A: 0.1% formic acid in water
Mobile phase B: 0.1% formic acid in acetonitrile
Gradient: 2-40% mobile phase B in 15 min, then 40-95% mobile phase B in 5 min, and keep 95% mobile phase B for 5 min
Injection sample amount: 100 fmol BSA digest
Temperature: ambient
MS instrument: LTQ XL™ MS with EASY-Spray™ ion source
Spray voltage: 1.9 kV
FIG. 17 shows the base peak chromatogram of the separation, and FIG. 18 shows the extracted ion chromatogram of ion with m/z 722. The peak retention time is 12.82 min. The peak width at half height (PWHH) is 2.53 seconds. The peak asymmetry factor (10% peak height) is 1.43.

Example 7. BSA Tryptic Digest Analysis Using 150 µm ID Column Coupling with the Female Type Emitter Assembly, Assembled in Example 2

To assess the function of the emitter assembly assembled in Example 2, a capillary column, as shown in FIG. 11, was connected to the emitter assembly to analyze BSA tryptic digest.

The capillary column was 150 µmID and 15 cm long. It was packed with PepMap™ C18, 2 µm media. Outside of both ends of the column, plug type capillary fittings were created for convenience and low dead volume connection with the emitter and nano HPLC system. LTQ XL™ mass spectrometer (MS) was used as the detector with an EASY-Spray™ ion source. The flow rate was 1.2 µL/min.

Figure 19:
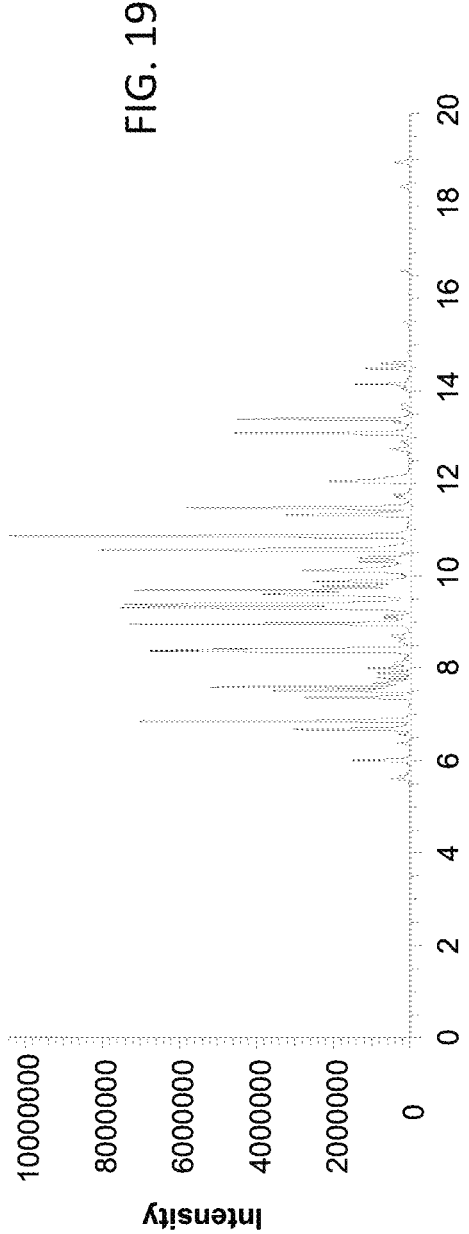
FIG. 19 shows a base peak chromatogram of the BSA tryptic digest analyzed using a 150 μm inner diameter column coupled with the female type emitter assembly described in Example 2.
Figure 20:
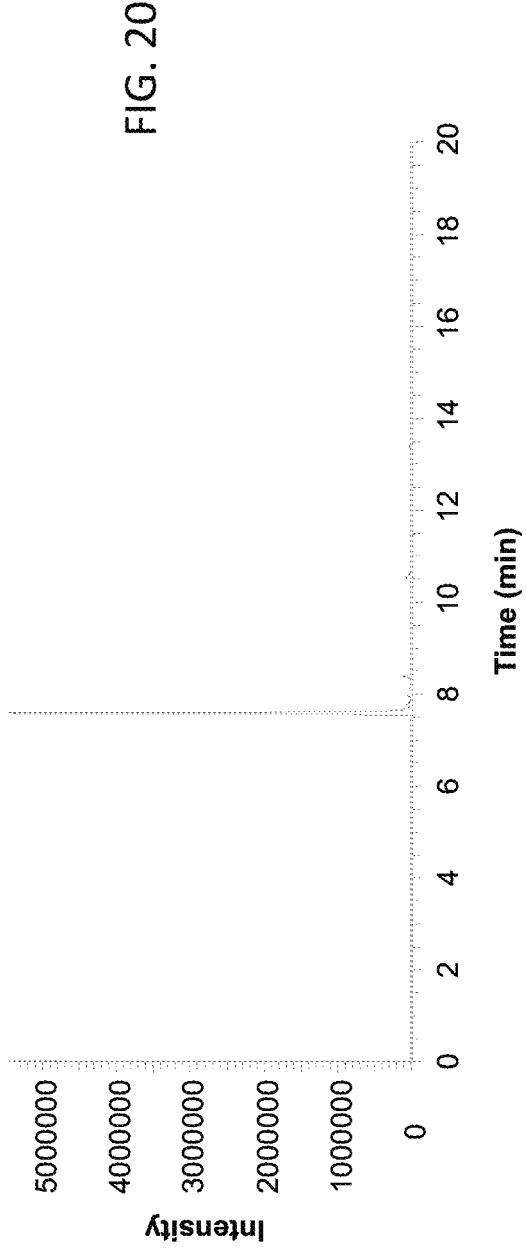
FIG. 20 shows the extracted ion chromatogram of ion with m/z 722.

The LC-MS running conditions include the following:
Nano HPLC system: UltiMate™ 3000 RSLCnano system with a capillary-flow selector
Flow rate: 1.2 µL/min
Mobile phase A: 0.1% formic acid in water
Mobile phase B: 0.1% formic acid in acetonitrile
Gradient: 2-40% mobile phase B in 15 min, then 40-95% mobile phase B in 5 min, and keep 95% mobile phase B for 5 min
Injection sample amount: 100 fmol BSA digest
Temperature: ambient
MS instrument: LTQ XL™ MS with EASY-Spray™ ion source
Spray voltage: 1.9 kV
FIG. 19 shows the base peak chromatogram of the separation, and FIG. 20 shows the extracted ion chromatogram of ion with m/z 722. The peak retention time is 7.59 min.

The peak width at half height (PWHH) is 2.17 seconds. The peak asymmetry factor (10% peak height) is 1.41.

Example 8. BSA Tryptic Digest Analysis Using 150 μm ID Column Coupling with the Male Type Emitter Assembly, Assembled in Example 3

To assess the function of the emitter assembly assembled in Example 3, a capillary column, as shown in FIG. 13, was connected to the emitter assembly through a union to analyze BSA tryptic digest.

The capillary column was 150 μm ID and 15 cm long. It was packed with PepMap™ C18, 2 μm media. Plug type capillary fittings were created at the column both ends for convenience and low dead volume connection with the emitter and nano HPLC system, respectively. The column outlet connected with the emitter assembly through a metal union, which has a 100 μm thick wall at the center and a 50 μm diameter through hole on the center of the wall. The emitter assembly will be plugged in an EASY-Spray™ ion source mounted on a LTQ XL™ mass spectrometer for ESI-MS detection. The flow rate was 1.2 μL/min.

Figure 21:
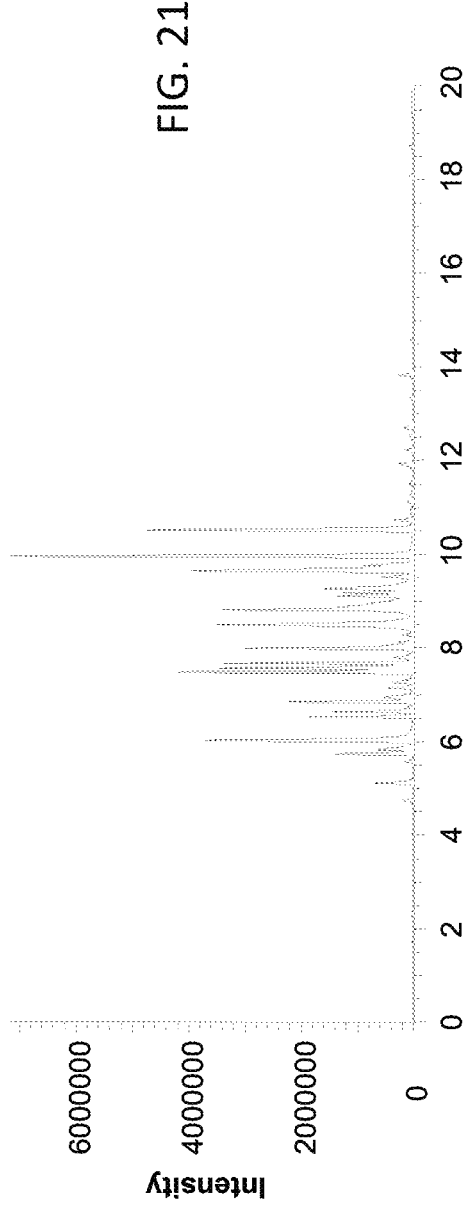
FIG. 21 shows a base peak chromatogram of the BSA tryptic digest analyzed using a 150 μm inner diameter column coupled with the male type emitter assembly described in Example 3.
Figure 22:
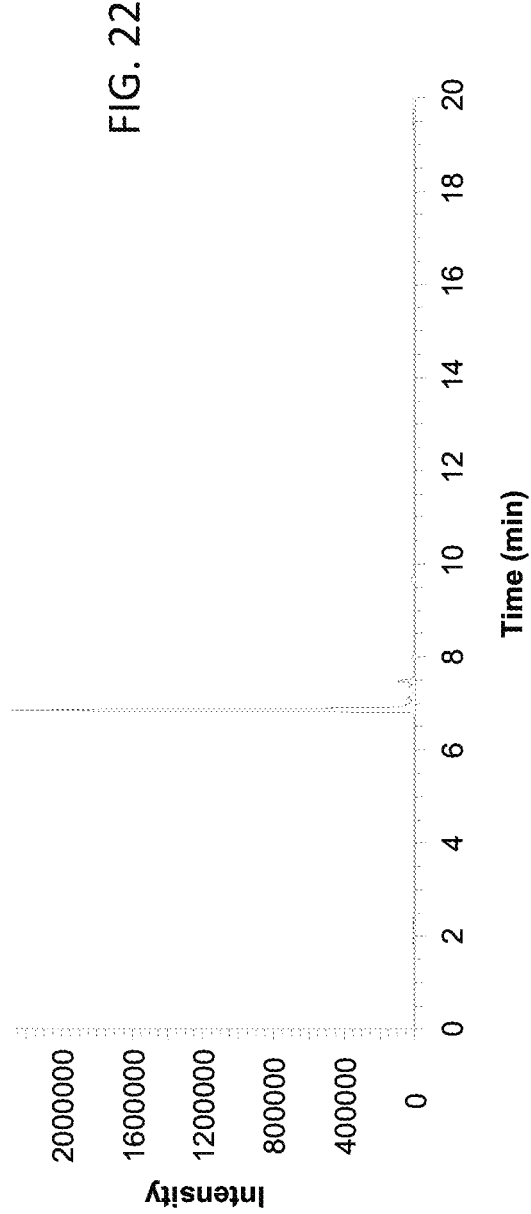
FIG. 22 shows the extracted ion chromatogram of ion with m/z 722.

The LC-MS running conditions include the following:
Nano HPLC system: UltiMate™ 3000 RSLCnano system with a capillary-flow selector
Flow rate: 1.2 μL/min
Mobile phase A: 0.1% formic acid in water
Mobile phase B: 0.1% formic acid in acetonitrile
Gradient: 2-40% mobile phase B in 15 min, then 40-95% mobile phase B in 5 min, and keep 95% mobile phase B for 5 min
Injection sample amount: 100 fmol BSA digest
Temperature: ambient
MS instrument: LTQ XL™ MS with EASY-Spray™ ion source
Spray voltage: 1.9 kV FIG. 21 shows the base peak chromatogram of the separation, and FIG. 22 shows the extracted ion chromatogram of ion with m/z 722. The peak retention time is 6.86 min. The peak width at half height (PWHH) is 3.06 seconds. The peak asymmetry factor (10% peak height) is 1.13.

Example 9. BSA Tryptic Digest Analysis Using 250 μm ID Column with the Male Type Emitter Assembly, Assembled in Example 3

The male type emitter assembly assembled in Example 3 was investigated by coupling it with a 250 μm ID capillary column for BSA tryptic digest analysis.

The column was packed in a 250 μm ID 15 cm long fused silica capillary and the packing media was PepMap™ C18, 2 μm. The whole column was protected in a PEEK sleeve and both ends of the column received a plug type capillary fitting for convenient and low dead volume connection. Its inlet connected with a nano HPLC instrument. Its outlet was connected with the male type emitter assembly through a metal union (as shown in FIG. 13), which has a 100 μm thick wall at the center and a 50 μm diameter through hole on the center of the wall. During testing, the emitter assembly was plugged into an EASY-Spray™ ion source, which was mounted on a LTQ XL™ mass spectrometer, for ESI-MS detection. The flow rate was 3 μL/min.

Figure 23:
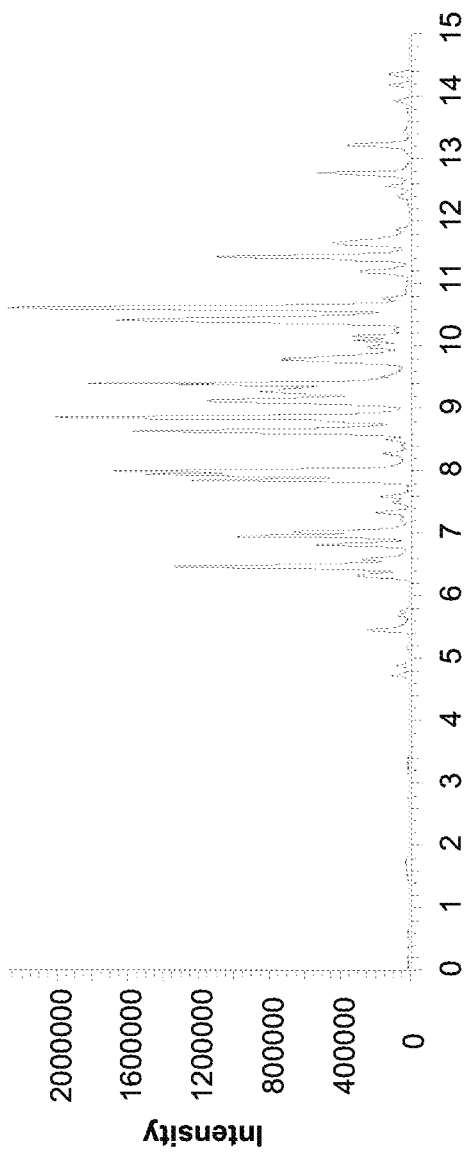
FIG. 23 shows a base peak chromatogram of the BSA tryptic digest analyzed using a 250 μm inner diameter column coupled with the male type emitter assembly described in Example 3.
Figure 24:
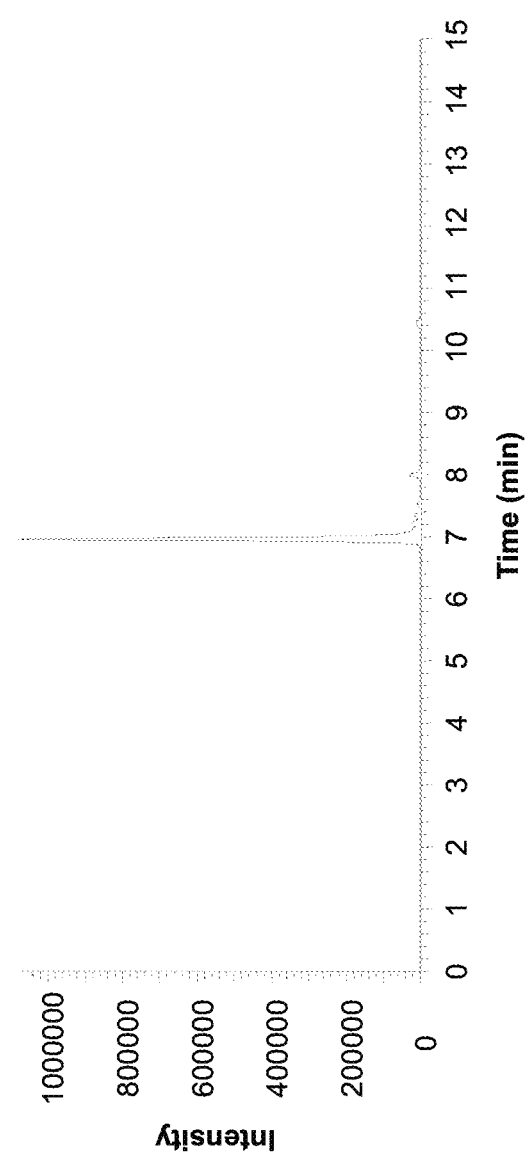
FIG. 24 shows the extracted ion chromatogram of ion with m/z 722.

The LC-MS running conditions include the following:
Nano HPLC system: UltiMate™ 3000 RSLCnano system with a capillary-flow selector
Flow rate: 3 μL/min
Mobile phase A: 0.1% formic acid in water
Mobile phase B: 0.1% formic acid in acetonitrile
Gradient: 2-40% mobile phase B in 15 min, then 40-95% mobile phase B in 5 min, and keep 95% mobile phase B for 5 min
Injection sample amount: 100 fmol BSA digest
Temperature: ambient
MS instrument: LTQ XL™ MS with EASY-Spray™ ion source
Spray voltage: 1.9 kV FIG. 23 shows the base peak chromatogram of the separation, and FIG. 24 shows the extracted ion chromatogram of ion with m/z 722. The peak retention time is 6.96 min. The peak width at half height (PWHH) is 3.71 seconds. The peak asymmetry factor (10% peak height) is 1.15.

Example 10. BSA Tryptic Digest Analysis Using 500 μm ID Column Coupling with the Male Type Emitter Assembly, Assembled in Example 4

The male type emitter assembly assembled in Example 4 was tested using a 500 μm ID micro column for BSA tryptic digest analysis.

The column was packed in a 500 μm ID and 10 cm long stainless steel tube, and packed with PepMap™ C18, 2 μm media. The emitter assembly could be directly screwed into the column outlet end fitting and finger tightened as shown in FIG. 14. The emitter assembly was then inserted into an EASY-Spray™ ion source, which was mounted on a LTQ XL™ mass spectrometer, for ESI-MS detection. The column inlet was connected with a nano HPLC pump through a transfer tubing (50 μm ID) to provide liquid flow. The testing flow rate was set 12 μL/min The LC-MS running conditions include the following:
Nano HPLC system: UltiMate™ 3000 RSLCnano system with a micro-flow selector
Flow rate: 12 μL/min
Mobile phase A: 0.1% formic acid in water
Mobile phase B: 0.1% formic acid in acetonitrile
Gradient: 2-40% mobile phase B in 10 min, then 40-95% mobile phase B in 5 min, and keep 95% mobile phase B for 5 min
Injection sample amount: 100 fmol BSA digest
Temperature: ambient
MS instrument: LTQ XL™ MS with EASY-Spray™ ion source
Spray voltage: 2.2 kV FIG. 25 shows the base peak chromatogram of the separation, and FIG. 26 shows the extracted ion chromatogram of ion with m/z 722. The peak retention time is 4.09 min. The peak width at half height (PWHH) is 2.49 seconds. The peak asymmetry factor (10% peak height) is 1.44.

Example 11. Column Performance Comparison Between the Emitter Assembly Used in Example 5 with Fully Integrated EASY-Spray™ Column (ES801, Thermo Fisher Scientific)

Figure 27:
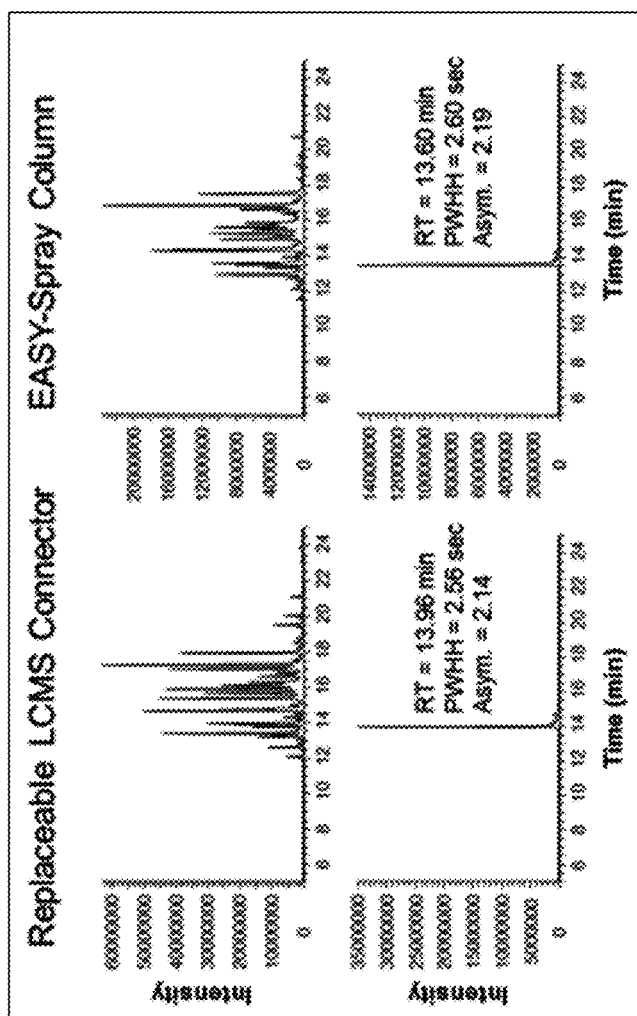
FIG. 27 is a column performance comparison between the assembly used in Example 5 and a fully integrated EASY-Spray™ column (ES801, Thermo Fisher Scientific), showing the base peak chromatograms of the separation and the extracted ion chromatograms of ion with m/z 722 from both columns.

To evaluate the performance of the assembly used in Example 5, an EASY-Spray™ column with the same column format and emitter dimension (ES801, Thermo Fisher Scientific) was tested with BSA tryptic digest under the same testing conditions as follows:
Nano HPLC system: UltiMate™ 3000 RSLCnano system with a nano-flow selector
Flow rate: 300 nL/min
Mobile phase A: 0.1% formic acid in water
Mobile phase B: 0.1% formic acid in acetonitrile Gradient: 2-40% mobile phase B in 15 min, then 40-95% mobile phase B in 5 min, and keep 95% mobile phase B for 5 min
Injection sample amount: 100 fmol BSA digest
Temperature: ambient
MS instrument: LTQ XL™ MS with EASY-Spray™ ion source
Spray voltage: 1.9 kV FIG. 27 shows the base peak chromatograms of the separation and the extracted ion chromatograms of ion with m/z 722 from both columns. Table 5 list the peak retention times, the peak width at half heights (PWHH) and the peak asymmetry factors (10% peak height), which indicates both columns provided comparable performance.

TABLE 5

722 m/z Peak Performance.

| LCMS Column Type | Retention Time (min) | Peak Width (sec) | Asymmetry |
|---|---|---|---|
| Emitter Assembly with Column | 13.96 | 2.56 | 2.14 |
| EASY-Spray ™ Column | 13.60 | 2.60 | 2.19 |

Example 12. Column Performance Comparison Between the Emitter Assembly Used in Example 6 with Fully Integrated EASY-Spray™ Column (ES804, Thermo Fisher Scientific)

Figure 28:
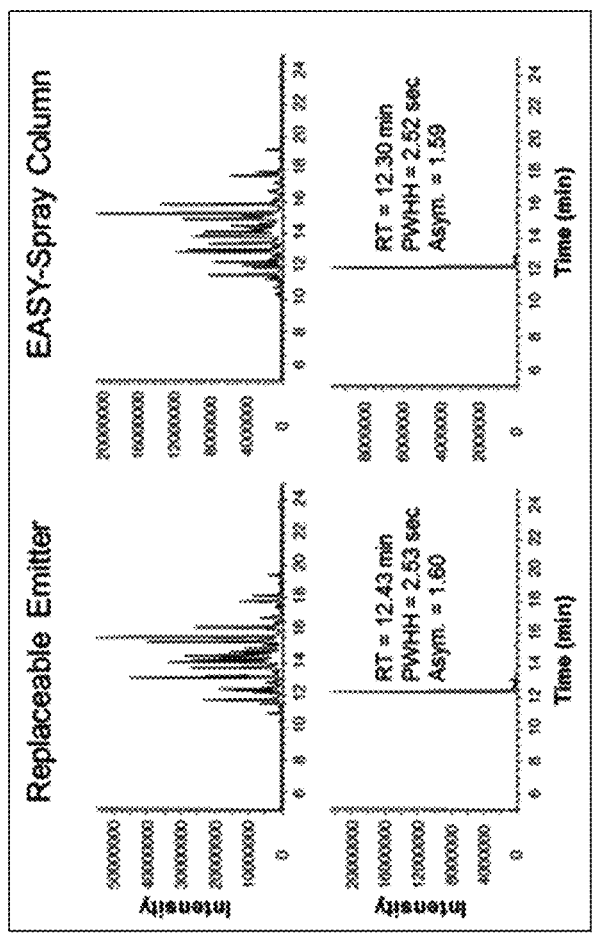
FIG. 28 is a column performance comparison between the assembly used in Example 6 and a fully integrated EASY-Spray™ column (ES804, Thermo Fisher Scientific), showing the base peak chromatograms of the separation and the extracted ion chromatograms of ion with m/z 722 from both columns.

To evaluate the performance of the assembly used in Example 6, an EASY-Spray™ column with the same column format and emitter dimension (ES804, Thermo Fisher Scientific) was tested with BSA tryptic digest under the same testing conditions as follows:
Nano HPLC system: UltiMate™ 3000 RSLCnano system with a nano-flow selector
Flow rate: 300 nL/min
Mobile phase A: 0.1% formic acid in water
Mobile phase B: 0.1% formic acid in acetonitrile
Gradient: 2-40% mobile phase B in 15 min, then 40-95% mobile phase B in 5 min, and keep 95% mobile phase B for 5 min
Injection sample amount: 100 fmol BSA digest
Temperature: ambient
MS instrument: LTQ XL™ MS with EASY-Spray™ ion source
Spray voltage: 1.9 kV FIG. 28 shows the base peak chromatograms of the separation and the extracted ion chromatograms of ion with m/z 722 from both columns. Table 6 lists the peak retention times, the peak width at half heights (PWHH) and the peak asymmetry factors (10% peak height), which indicates both columns provided comparable performance.

TABLE 6

722 m/z Peak Performance.

| LCMS Column Type | Retention Time (min) | Peak Width (sec) | Asymmetry |
|---|---|---|---|
| Emitter Assembly with Column | 12.43 | 2.53 | 1.60 |
| EASY-Spray ™ Column | 12.30 | 2.52 | 1.59 |

Example 13. Column Performance Comparison Between the Emitter Assembly Used in Example 7 with a Cully Integrated EASY-Spray™ Column (ES806, Thermo Fisher Scientific)

Figure 29:
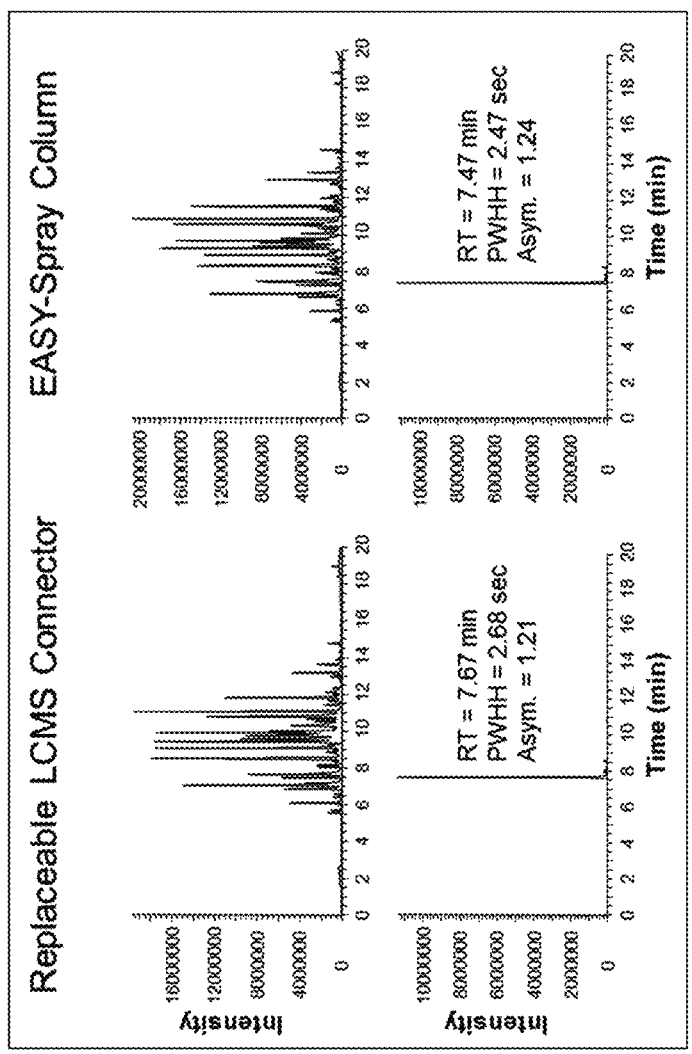
FIG. 29 is a column performance comparison between the assembly used in Example 7 and a fully integrated EASY-Spray™ column (ES806, Thermo Fisher Scientific), showing the base peak chromatograms of the separation and the extracted ion chromatograms of ion with m/z 722 from both columns.

To evaluate the performance of the assembly used in Example 7, an EASY-Spray™ column with the same column format and emitter dimension (ES806, Thermo Fisher Scientific) was tested with BSA tryptic digest under the same testing conditions as follows:
Nano HPLC system: UltiMate™ 3000 RSLCnano system with a capillary-flow selector
Flow rate: 1.2 µL/min
Mobile phase A: 0.1% formic acid in water
Mobile phase B: 0.1% formic acid in acetonitrile
Gradient: 2-40% mobile phase B in 15 min, then 40-95% mobile phase B in 5 min, and keep 95% mobile phase B for 5 min
Injection sample amount: 100 fmol BSA digest
Temperature: ambient
MS instrument: LTQ XL™ MS with EASY-Spray™ ion source
Spray voltage: 1.9 kV FIG. 29 shows the base peak chromatograms of the separation and the extracted ion chromatograms of ion with m/z 722 from both columns. Table 7 lists the peak retention times, the peak width at half heights (PWHH) and the peak asymmetry factors (10% peak height), which indicates both columns provided comparable performance.

TABLE 7

722 m/z Peak Performance.

| LCMS Column Type | Retention Time (min) | Peak Width (sec) | Asymmetry |
|---|---|---|---|
| Emitter Assembly with Column | 7.67 | 2.68 | 1.21 |
| EASY-Spray ™ Column | 7.47 | 2.47 | 1.24 |

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. An electrospray emitter assembly for interfacing a separation column to a mass spectrometer, comprising:
   a. an emitter capillary having an inlet end and an outlet end; and
   b. a fitting coupled to the inlet end of the emitter, configured to be removably connected to the separation column, the fitting including an externally threaded side and a threaded inlet side;
   c. an electrically conductive sheath having a recess for receiving a contact ball to make a high voltage contact, the electrically conductive sheath supported by a cap nut and detachable from the fitting;
   d. a retractable protective sleeve slidably mounted around the emitter for covering and supporting the emitter, the retractable protective sleeve moveable to an extended position wherein a tip of the emitter is covered by the protective sleeve;

e. a resilient member is provided to bias the protective sleeve towards the extended position such that the tip of the emitter is covered;

wherein a stop with a defined through hole is integrated proximate the inlet end of the emitter to produce a path for liquid to flow from the separation column to the emitter via the through hole where a voltage is applied to the liquid entering the emitter.

2. The emitter assembly of claim 1 wherein the fitting is a female threaded end fitting.

3. The emitter assembly of claim 2 wherein the female threaded end fitting is configured for engagement with a plug type capillary fitting of the separation column.

4. The emitter assembly of claim 1 wherein the emitter capillary comprises a fused silica capillary, a metal capillary, a ceramic capillary, or a glass capillary.

5. The emitter assembly of claim 1 wherein the separation column is removably connected via a transfer line with the emitter capillary through the fitting.

6. The emitter assembly of claim 1 wherein the separation column is a liquid chromatography (LC) column.

7. The emitter assembly of claim 1 wherein the integrated stop has a thickness of up to 1.0 mm.

8. The emitter assembly of claim 1 wherein the integrated stop has a thickness of between 100 µm to 300 µm.

9. The emitter assembly of claim 1 wherein the through hole in the stop has a diameter of between 3 µm and 100 µm.

10. The emitter assembly of claim 1 wherein the retractable protective sleeve is moveable to a retracted position wherein a tip of the emitter is uncovered.

11. The emitter assembly of claim 1 wherein the protective sleeve is enclosed and moveable within the outer sheath, and the electrically conductive outer sheath is electrically coupled to the fitting.

12. An electrospray emitter assembly for interfacing a separation column to a mass spectrometer, comprising:
   a. an emitter capillary having an inlet end and an outlet end; and
   b. a plug type end fitting coupled to the inlet end of the emitter, the plug type end fitting including a threaded fitting, a metal sleeve and a PEEK sleeve and configured to be removably connected to the separation column;
   c. an electrically conductive sheath having a recess for receiving a contact ball to make a high voltage contact wherein the electrically conductive sheath encloses and electrically contacts the threaded fitting;
   d. a retractable protective sleeve slidably mounted around the emitter for covering and supporting the emitter, the retractable protective sleeve moveable to an extended position wherein a tip of the emitter is covered by the protective sleeve; and
   e. a resilient member provided to bias the protective sleeve towards the extended position such that the tip of the emitter is covered.

13. The emitter assembly of claim 12 wherein the emitter capillary comprises a fused silica capillary, a metal capillary, a ceramic capillary, or a glass capillary.

14. The emitter assembly of claim 12 wherein the separation column is removably connected via a transfer line with the emitter capillary through the plug type end fitting.

15. The emitter assembly of claim 12 wherein the separation column is a liquid chromatography (LC) column.

16. The emitter assembly of claim 12 wherein the plug type end fitting is a male threaded end fitting.

17. The emitter assembly of claim 12 further comprising a retractable protective sleeve for covering and supporting the emitter.

18. The emitter assembly of claim 17 wherein the retractable protective sleeve is slidably mounted around the emitter.

19. The emitter assembly of claim 18 wherein the retractable protective sleeve is moveable to an extended position wherein a tip of the emitter is covered by the protective sleeve.

20. The emitter assembly of claim 19 wherein a resilient member is provided to bias the protective sleeve towards the extended position such that the tip of the emitter is covered.

21. The emitter assembly of claim 18 wherein the retractable protective sleeve is moveable to a retracted position wherein a tip of the emitter is uncovered.

22. The emitter assembly of claim 18 further comprising an electrically conductive outer sheath, wherein the protective sleeve is enclosed and moveable within the outer sheath, and the electrically conductive outer sheath is electrically coupled to the fitting.

* * * * *